US008784176B2

(12) United States Patent
Ryan

(10) Patent No.: US 8,784,176 B2
(45) Date of Patent: Jul. 22, 2014

(54) ELECTRONIC GAMING DEVICE WITH CONTAGIOUS WILD SYMBOLS

(71) Applicant: Timothy Ryan, Duluth, GA (US)

(72) Inventor: Timothy Ryan, Duluth, GA (US)

(73) Assignee: Cadillac Jack, Inc., Duluth, GA (US)

( * ) Notice: Subject to any disclaimer, the term of this patent is extended or adjusted under 35 U.S.C. 154(b) by 0 days.

(21) Appl. No.: 13/754,435

(22) Filed: Jan. 30, 2013

(65) Prior Publication Data

US 2013/0324202 A1 Dec. 5, 2013

Related U.S. Application Data

(63) Continuation of application No. 13/487,429, filed on Jun. 4, 2012.

(51) Int. Cl.

| | |
|---|---|
| ***A63F 9/24*** | (2006.01) |
| ***A63F 13/00*** | (2014.01) |
| ***G07F 17/32*** | (2006.01) |
| *G07F 17/34* | (2006.01) |

(52) U.S. Cl.
CPC ............ *G07F 17/3262* (2013.01); *G07F 17/34* (2013.01); *G07F 17/3288* (2013.01); *G07F 17/3265* (2013.01); *G07F 17/326* (2013.01)
USPC .............. 463/16; 463/20; 463/42; 273/138.1; 273/138.2; 273/143 R

(58) Field of Classification Search
CPC ...................................................... G07F 17/32
USPC ....... 463/16, 20, 42; 273/138.1, 138.2, 143 R
See application file for complete search history.

(56) References Cited

U.S. PATENT DOCUMENTS

| | | | | |
|---|---|---|---|---|
| 6,805,632 | B2 * | 10/2004 | Suda | 463/25 |
| 7,553,231 | B2 * | 6/2009 | Rodgers et al. | 463/20 |
| 7,758,414 | B1 * | 7/2010 | Marks et al. | 463/20 |
| 8,137,179 | B2 * | 3/2012 | Jensen et al. | 463/20 |
| 2003/0064779 | A1 * | 4/2003 | Suda | 463/20 |
| 2005/0143164 | A1 * | 6/2005 | Duhamel et al. | 463/20 |
| 2007/0060248 | A1 * | 3/2007 | Rodgers et al. | 463/16 |
| 2012/0046089 | A1 * | 2/2012 | Kemper | 463/20 |

* cited by examiner

*Primary Examiner* — William Brewster
*Assistant Examiner* — Ryan Hsu
(74) *Attorney, Agent, or Firm* — CF3; Stephen Eisenmann

(57) ABSTRACT

Examples disclosed herein relate to systems and methods, which may provide gaming options relating to contagious wilds, non-contagious wilds, dormant wilds, contagious dormant wilds, and/or blockers.

20 Claims, 15 Drawing Sheets

ELECTRONIC GAMING DEVICE WITH CONTAGIOUS WILD SYMBOLS

CROSS-REFERENCE TO RELATED PATENT APPLICATION

This application is a continuation of prior application Ser. No. 13/487,429 entitled "ELECTRONIC GAMING DEVICE WITH CONTAGIOUS WILD SYMBOLS", filed on Jun. 4, 2012, which is incorporated herein by reference in its entirety.

BACKGROUND

1. Field

The subject matter disclosed herein relates to an electronic gaming device. More specifically, the disclosure relates to an electronic gaming device, which provides gaming options relating to the ability of contagious symbols and/or contagious symbol areas on reels to modify and/or activate other symbols.

2. Information

The gaming industry has numerous casinos located both worldwide and in the United States. A client of a casino or other gaming entity can gamble via various games of chance. For example, craps, roulette, baccarat, blackjack, and electronic games (e.g., slot machines) where a person may gamble on an outcome.

Paylines of an electronic gaming device (e.g., slot machine) are predetermined winning symbols being aligned in a predetermined pattern as defined by the electronic gaming device. A winning event occurs when the player successful matches the predetermined winning symbols in one of the predetermined patterns. In this disclosure, a player, the gaming device, and/or the gaming system may be allowed to activate contagious symbols on the reels which may modify other symbols.

BRIEF DESCRIPTION OF THE FIGURES

Non-limiting and non-exhaustive examples will be described with reference to the following figures, wherein like reference numerals refer to like parts throughout the various figures.

FIG. 5(*b*) is an illustration of activated wilds (i.e., dormant wilds activated by contagious wilds) displayed on the electronic gaming device, according to one embodiment.

FIG. 5(*c*) is another illustration of activated wilds (i.e., dormant wilds activated by contagious wilds) displayed on the electronic gaming device, according to one embodiment.

FIG. 5(*d*) is another illustration of activated wilds (i.e., dormant wilds activated by contagious wilds) displayed on the electronic gaming device, according to one embodiment.

FIG. 5(*e*) is another illustration of activated wilds (i.e., dormant wilds activated by contagious wilds) displayed on the electronic gaming device, according to one embodiment.

FIG. 6(*b*) is an illustration of activated wilds (i.e., dormant wilds activated by contagious wilds) displayed on the electronic gaming device, according to one embodiment.

FIG. 6(*c*) is an illustration of activated wilds (i.e., dormant wilds activated by contagious wilds) displayed on the electronic gaming device, according to one embodiment.

FIG. 7(*b*) is an illustration of activated wilds (i.e., dormant wilds activated by contagious wilds) displayed on the electronic gaming device, according to one embodiment.

FIG. 8(*b*) is an illustration of activated wilds (i.e., dormant wilds activated by contagious wilds) displayed on the electronic gaming device, according to one embodiment.

FIG. 9(*b*) is an illustration of activated wilds (i.e., dormant wilds activated by contagious wilds) displayed on the electronic gaming device, according to one embodiment.

DETAILED DESCRIPTION

Figure 1:
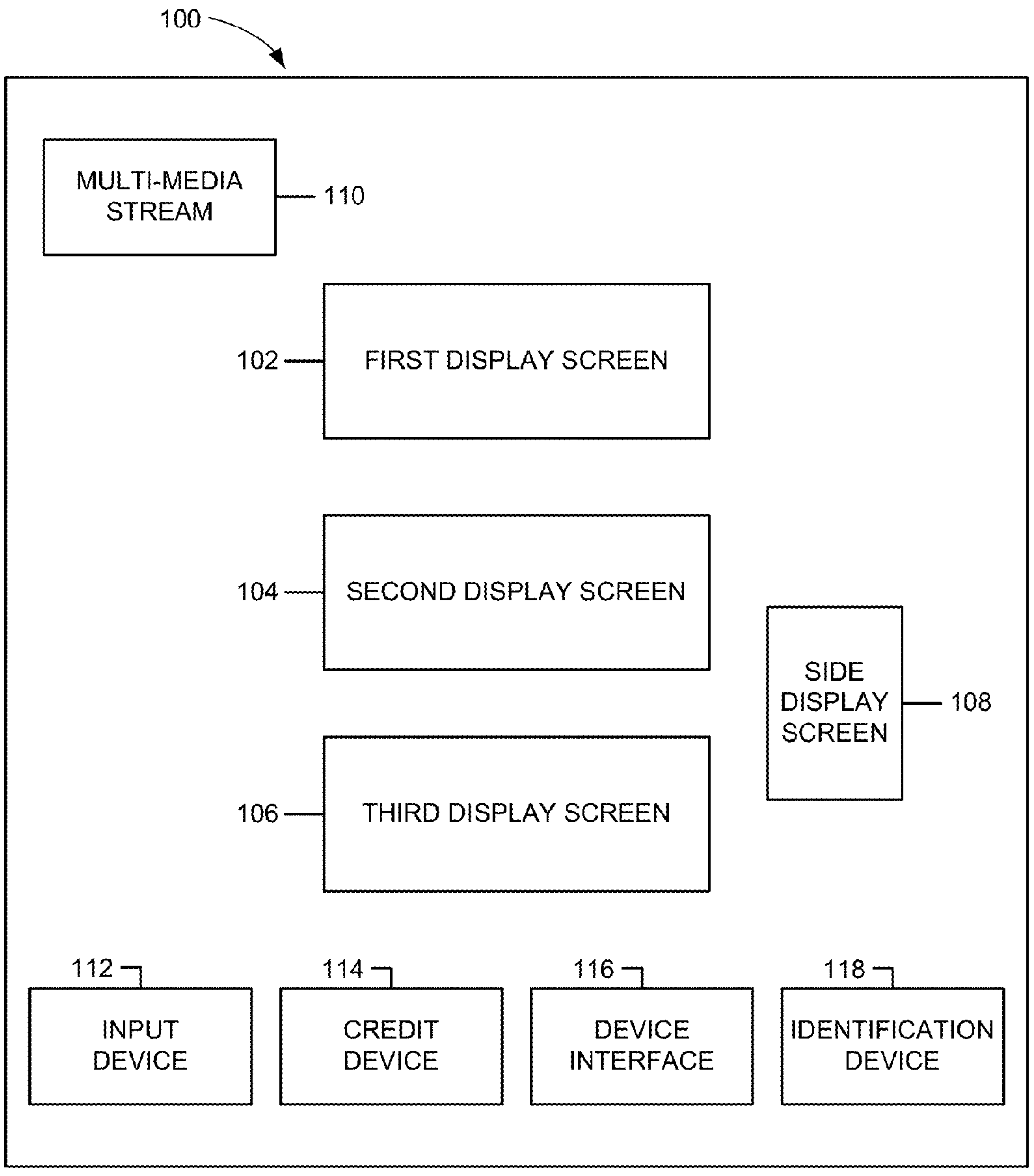
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an internet event, and/or any combination thereof. In another example, the wagering event may be a poker tournament, a horse race, a car race, and/or any combination thereof. The advertisement may be an advertisement for the casino, a restaurant, a shop, any other entity, and/or any combination thereof. The sporting event may be a football game, a baseball game, a hockey game, a basketball game, any other sporting event, and/or any combination thereof. All of these multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to select a row and/or column, to select a wild symbol, to select a path or option for game progress, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, or any combination thereof.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, or any combination thereof.

Device interface 116 may be utilized to connect a player to electronic gaming device 100 through a mobile device, card, keypad, identification device 118, or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, a row rearrangement option may be presented, a column rearrangement option may be presented, a row area rearrangement option may be presented, a column area rearrangement option may be presented, a two-dimensional gaming option may be presented, a three-dimensional gaming option may be presented, and the placement of gaming options may be modified based on player preference data. For example, a player may want to have only games with the contagious wild option available. Therefore, only games with the contagious wild options would be presented. In another example, the player may not want game play options which contain blocking symbols. Therefore, no blocking game play options would be presented.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, or any combination thereof. Second display screen 104, third display screen 106, side display screen 108, and any other screen may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multi-media 110, and the media may be displayed on first display screen 102.

Figure 2:
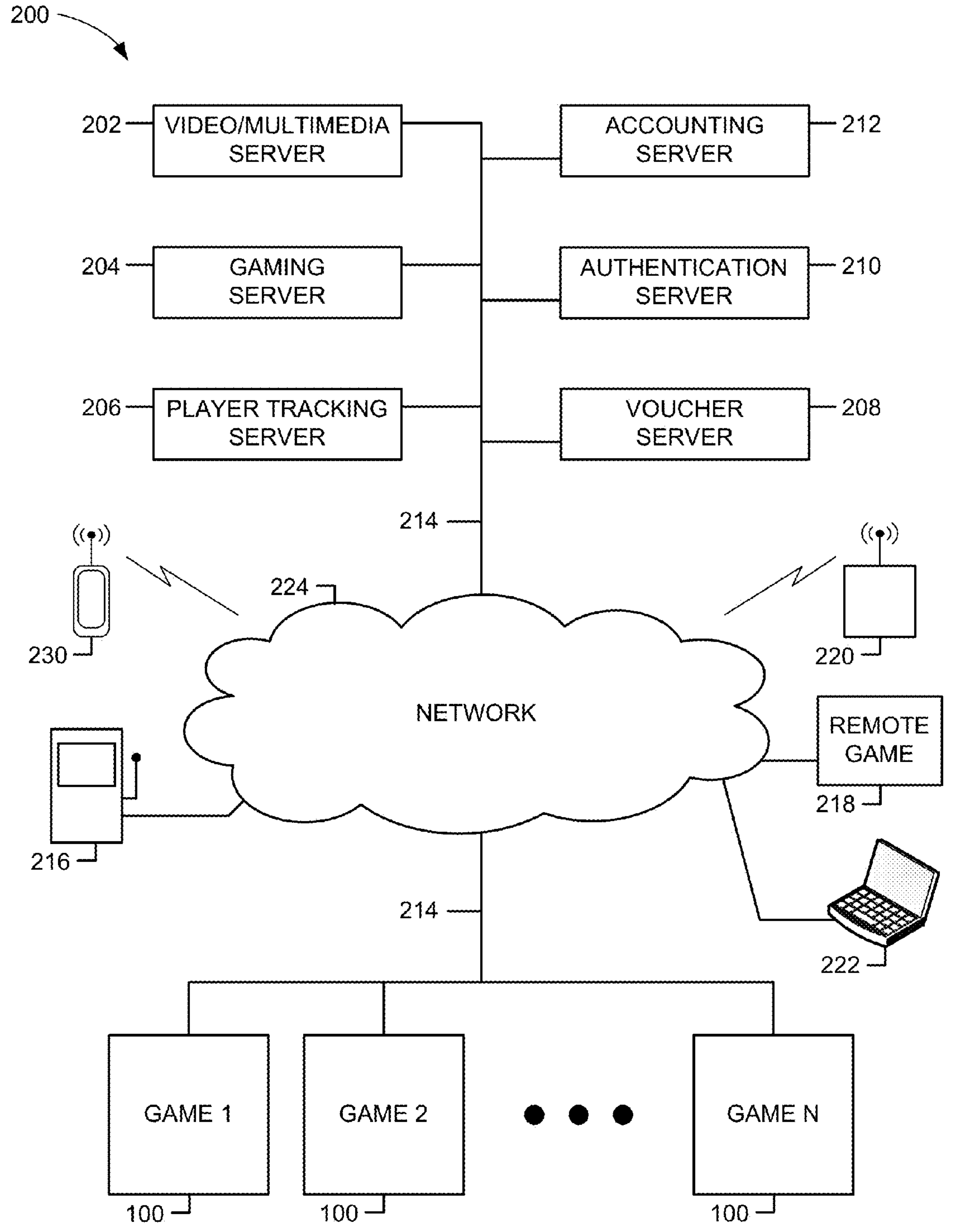
FIG. 2 is an illustration of an electronic gaming system, according to one embodiment.

In FIG. 2, an electronic gaming system 200 is shown. Electronic gaming system 200 may include a video/multi-media server 202, a gaming server 204, a player tracking server 206, a voucher server 208, an authentication server 210, and an accounting server 212.

Electronic gaming system 200 may include video/multi-media server 202, which may be coupled to network 224 via a network link 214. Network 224 may be the internet, a private network, or a network cloud. One or more video streams may be received at video/multimedia server 202 from other electronic gaming devices 100. Video/multi-media server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video server 202 may transmit these video streams via network link 214 and/or network 224.

For example, a remote gaming device at the same location may be a casino with multiple casino floors, a casino which allows wagering activities to take place from the room, a casino which may allow wagering activities to take place from the pool area, etc. In another example, the remote devices may be at another location, such a progressive link to another casino, or a casino corporation, which owns many different casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include wild option selections. In addition, the voucher may include a summary of contagious wilds or game play progress.

Authentication server 210 may determine the validity of vouchers, a player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for player's tracked outcomes.

Network connection 214 may be used for communication between dedicated servers, thin clients, thick clients, back-office accounting systems, etc.

Laptop computer 222 and/or any other electronic device (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (such as cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components such as network interface cards, repeaters and hubs, bridges, switches, routers, and firewalls, or any combination thereof may also be part of network 224.

Figure 3:
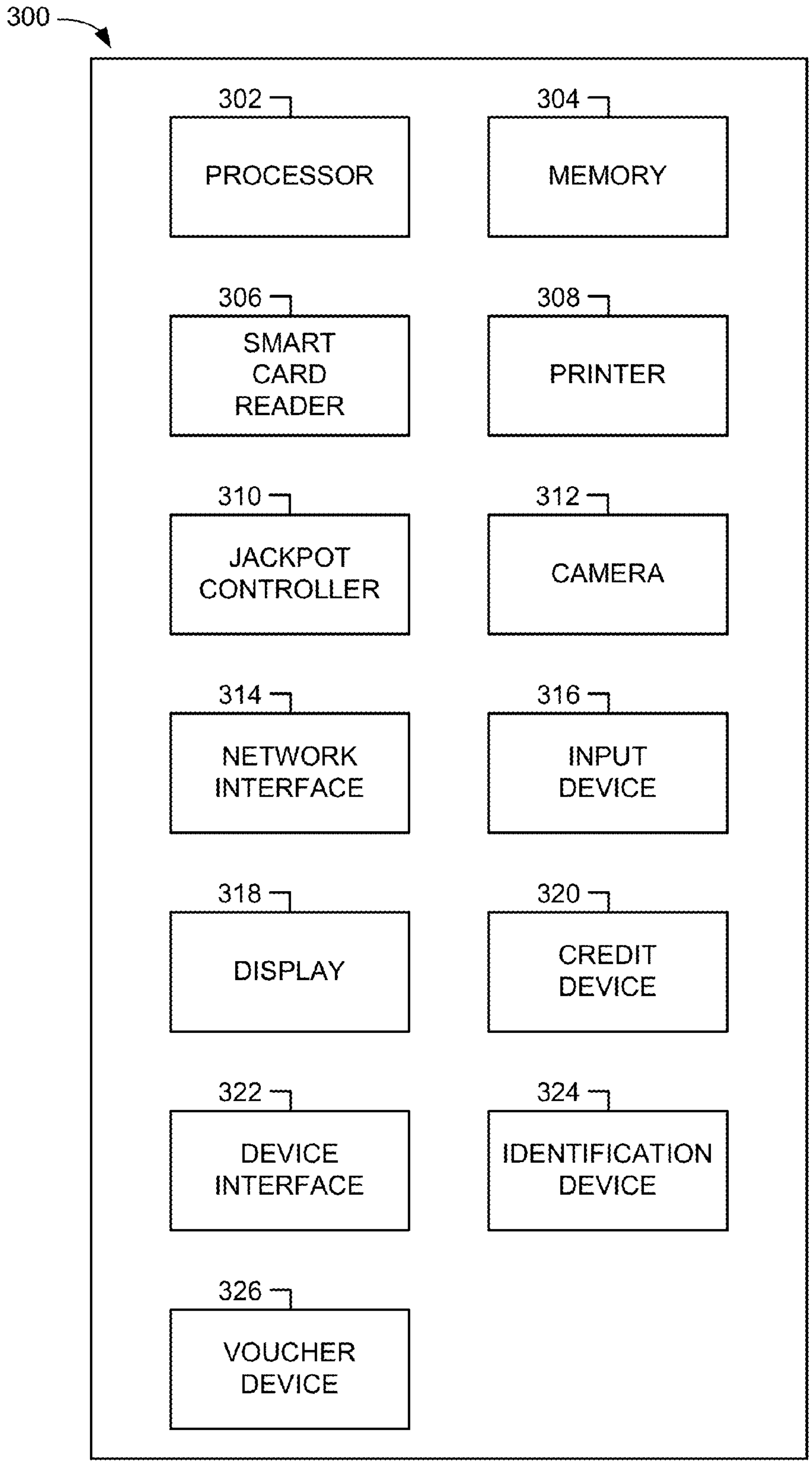
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display content onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, printer 308 may print the information stored on memory 304 onto a voucher and/or video or pictures captured by camera 312 may be saved and stored on memory 304. Memory 304 may include a confirmation module, which may authenticate a value of a voucher and/or the validity of the voucher. The processor may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory such as read-only memory ("ROM"), erasable programmable read-only memory ("EPROM"), electrically erasable programmable read-only memory ("EEPROM"), flash memory ("NVRAM"), or Nano-RAM (carbon nanotube random access memory), and/or any combination thereof.

Memory 304 may also be volatile semiconductor memory such as dynamic random access memory ("DRAM") or static random access memory ("SRAM"), and/or any combination thereof.

Memory 304 may also be a data storage device such as a hard disk drive, an optical disk drive such as CD, DVD, or Blu-ray, a solid state drive, a memory stick, a CompactFlash card, a USB flash drive, a Multimedia Card, an xD-Picture Card, or any combination thereof.

Memory 304 may be used to store read-only program instructions for execution by processor 302, for the read-write storage for global variables and static variables, read-write storage for uninitialized data, read-write storage for dynamically allocated memory, and for the read-write storage of the data structure known as "the stack", or any combination thereof.

Memory 304 may be used to store the read-only pay table information for which symbol combinations on a given payline that result in a win (payout) are established for games of chance such as slot games and video poker.

Memory 304 may be used to store accounting information (such as cashable electronic promotion in, non-cashable electronic promotion out, coin in, coin out, bill in, voucher in, voucher out, electronic funds transfer in, etc.).

Memory 304 may be used to record error conditions on an electronic gaming device 100 such as door open; coin jam; ticket print failure; ticket (paper) jam; program error; reel tilt; etc. or any combination thereof.

Memory 304 may also be used to record the complete history for the most recent game played plus some number of prior games, as may be determined by the regulating authority.

Smart card reader 306 may allow electronic gaming device 100 to access and read information provided by the player or technician, which may be used for setting of player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupon (i.e., a wagering instrument with a fixed waging value that can only be used for non-cashable credits), drink tokens, comps, or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include their image into the game play. A picture of a player may be an actual image as taken by camera 312. A picture of a player may be a computerized caricature of image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Video obtained by camera 312 may then be used as part of game play, or may be used for security purposes. For example, a camera located on electronic gaming device 100 may capture video of a potential illegal activity (e.g., tampering with the machine, crime in the vicinity, underage players, etc.).

Network interface 314 may allow electronic gaming device 100 to communicate with video server 202, gaming server 204, player tracking server 206, voucher server 208, authentication server 210, and/or accounting server 212.

Input device 316 may be mechanical buttons, electronic buttons, a touch screen, or any combination thereof. Input device 316 may be utilized to make a wager, to make an offer to buy or sell a voucher, to determine a voucher's worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow for game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with their mobile device (e.g., smart phone) to receive information from and/or transmit information to electronic gaming device 100 (e.g., watch a movie, listen to music, obtain verbal betting options, verification of identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or alternate display screen as set in the player's options.

A voucher device 326 may generate, print, transmit, or receive a voucher. The voucher may represent a wagering option, a wagering structure, a wagering timeline, a value of wager, a payout potential, a payout, or any other wagering data. A voucher may represent an award, which may be used for other locations inside of the gaming establishment. For example, the voucher may be a coupon for the local buffet or a concert ticket.

Figure 4:
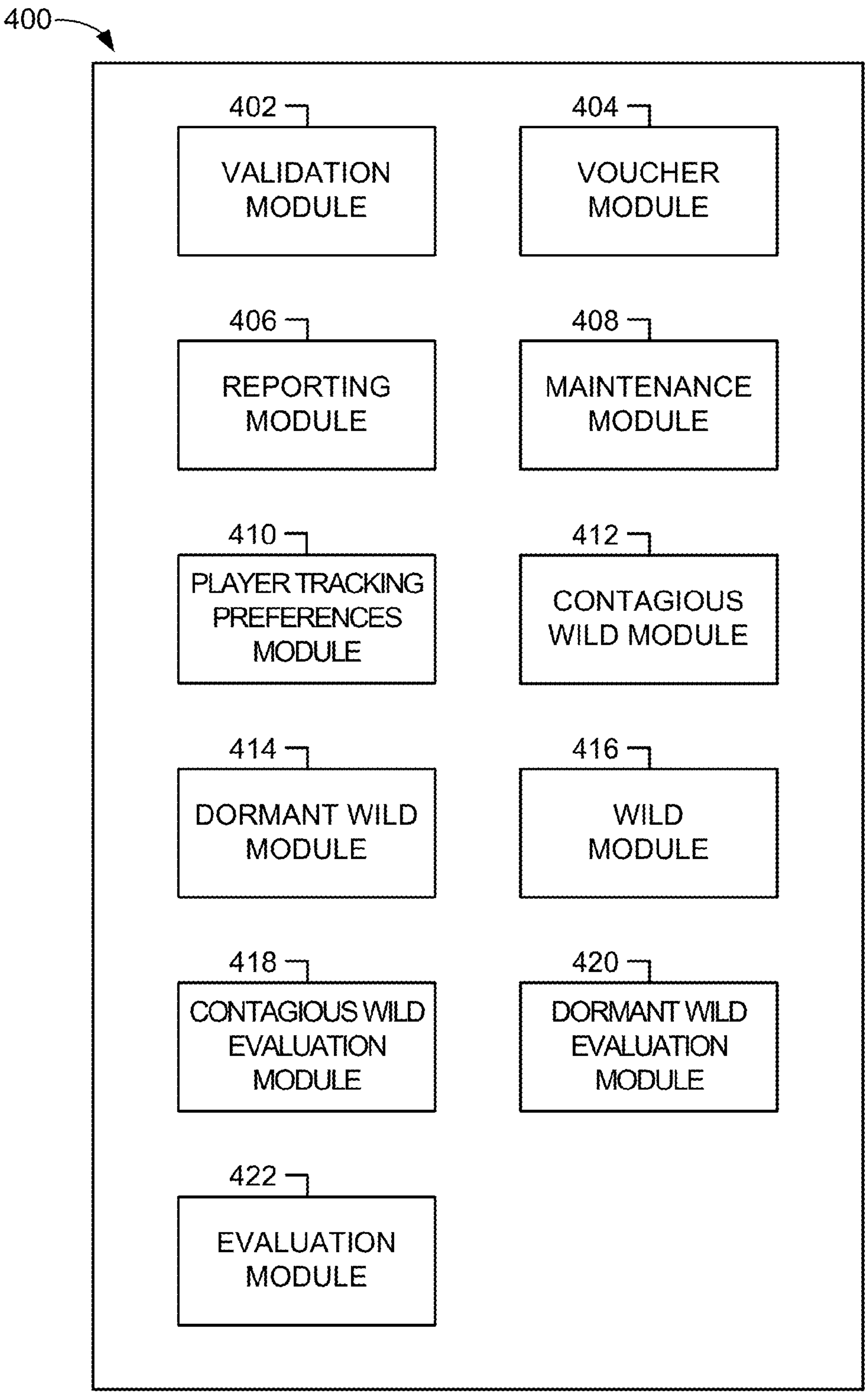
FIG. 4 is a block diagram of the electronic gaming device, according to one embodiment.
Figure 5A:
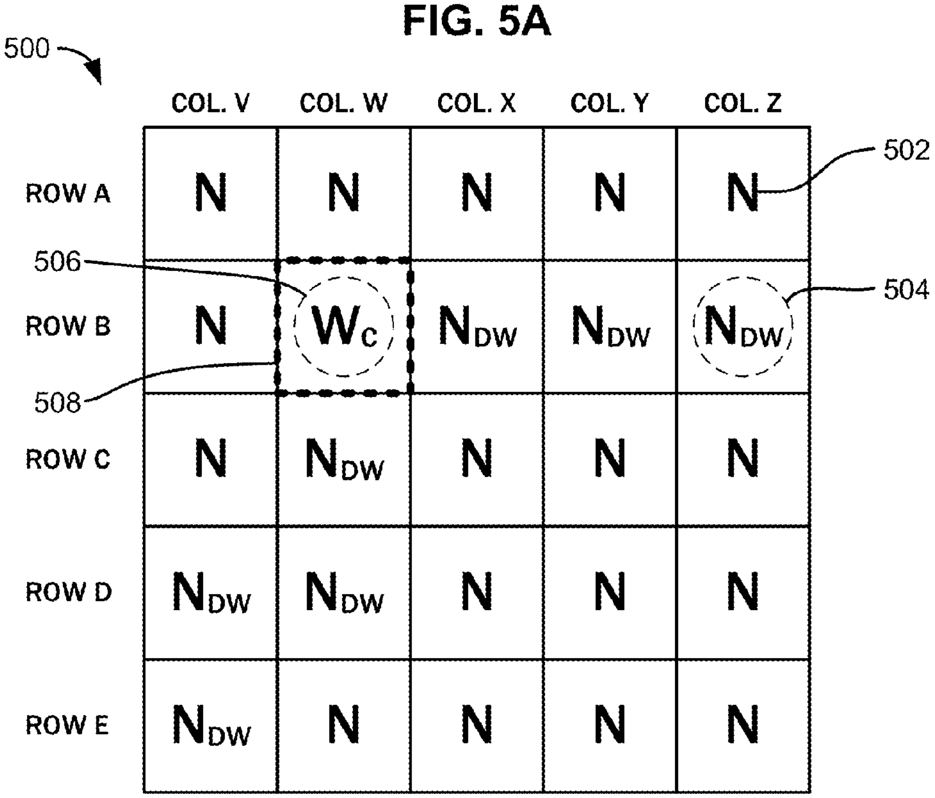
FIG. 5(*a*) is an illustration of paylines and reels of the electronic gaming device with contagious wilds and dormant wilds, according to one embodiment.
Figure 5B:
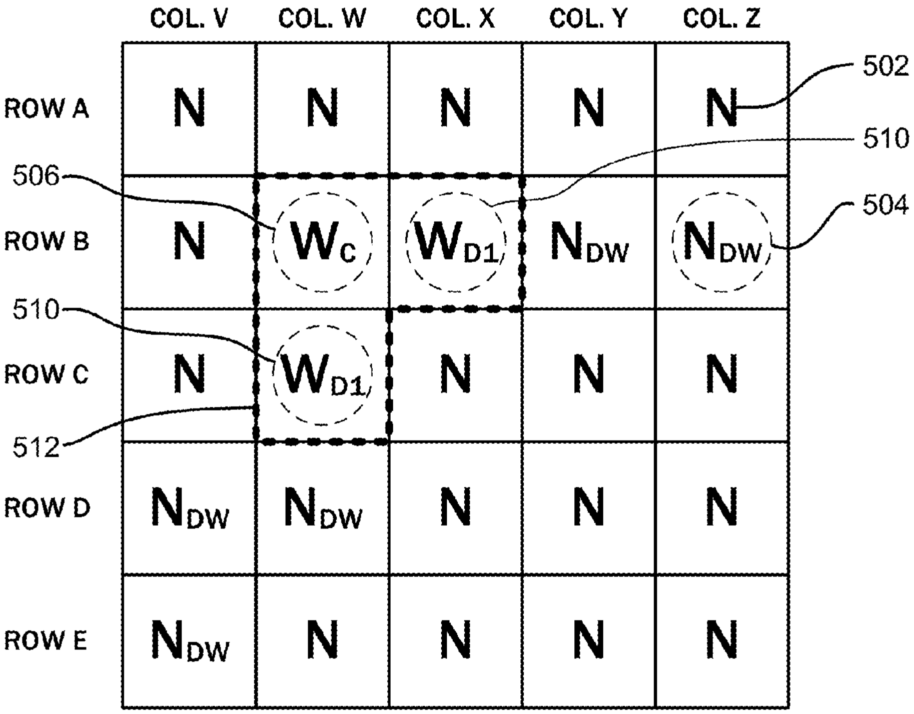
Figure 5C:
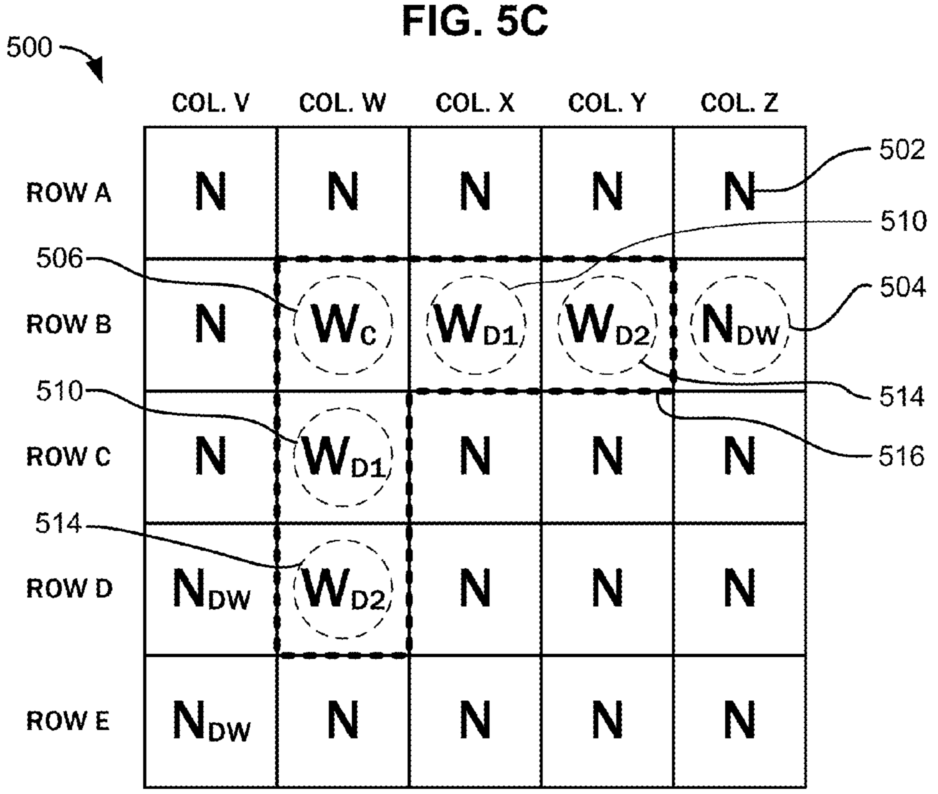
Figure 5D:
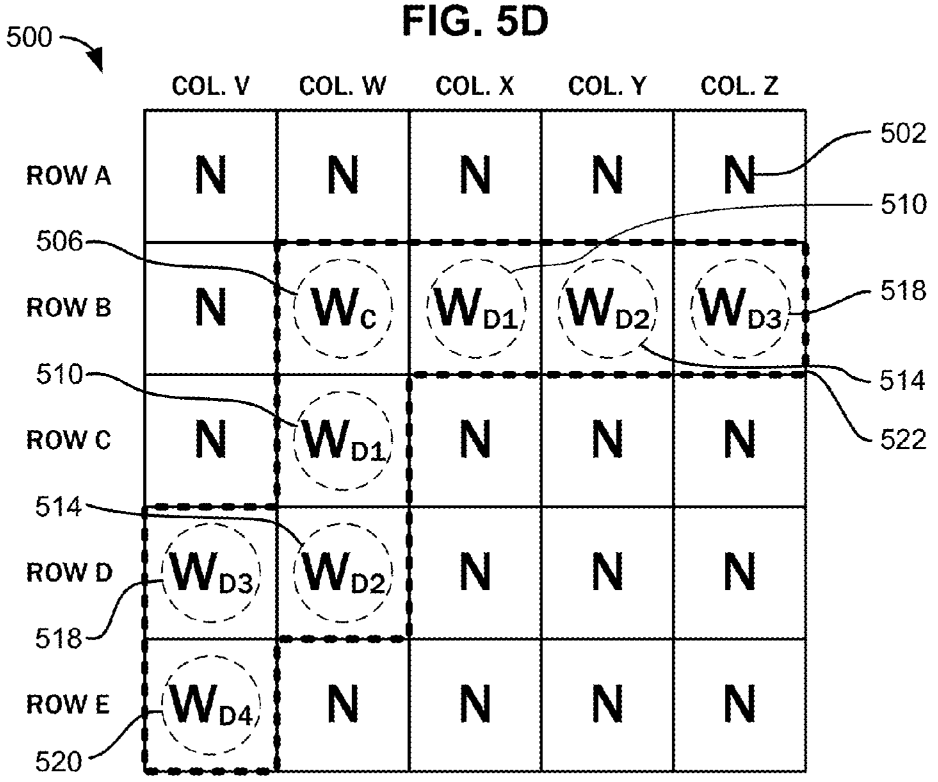
Figure 5E:
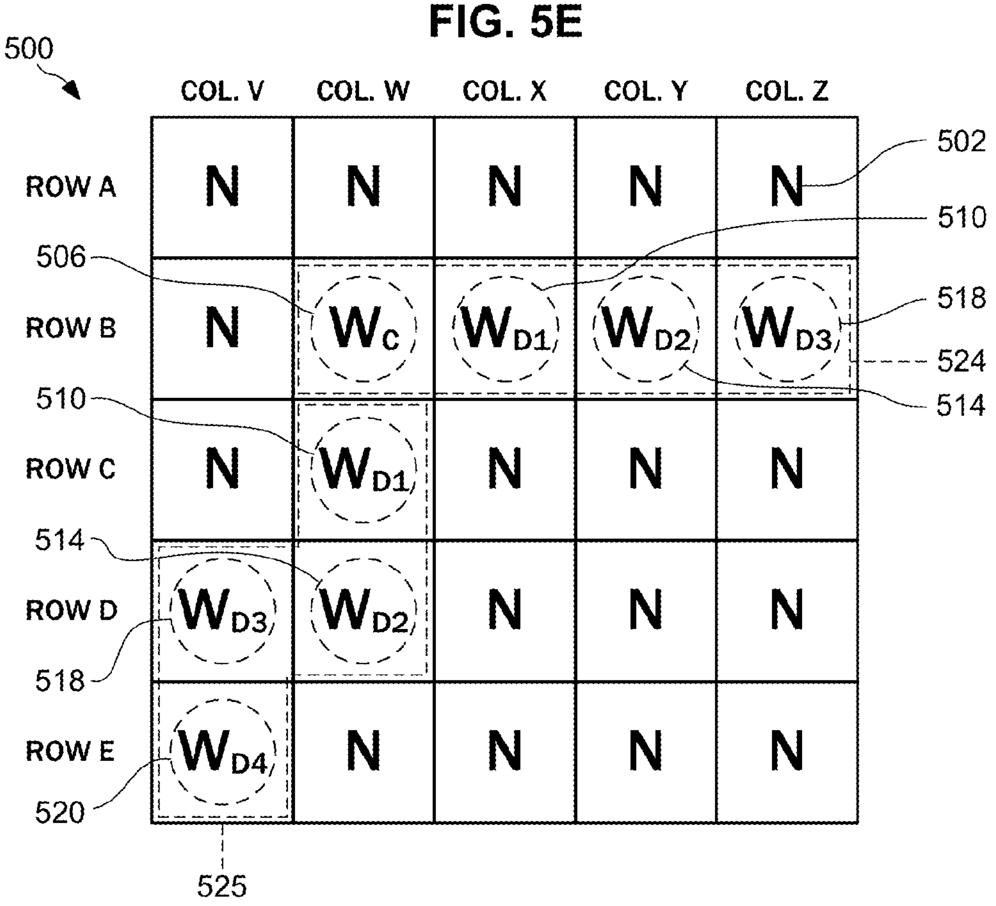

FIG. 4 shows a block diagram of memory 304, which includes various modules. Memory 304 may include a validation module 402, a voucher module 404, a reporting module 406, a maintenance module 408, a player tracking preferences module 410, an evaluation contagious wild module 412, a dormant wild module 414, a wild module 416, a contagious wild evaluation module 418, a dormant wild evaluation module 420, and an evaluation module 422.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Contagious wild module 412 may store various contagious wild structures related to game results. For example, contagious wild structures may include one-to-five contagious wild(s) in a row; one-to-five contagious wild(s) in a column; one contagious wild in a first row, one contagious wild in a third row, and one contagious wild in a five row; one contagious wild in a first column, one contagious wild in a second column, one contagious wild in a fourth column, and one contagious wild in a fifth column; or any combination that utilizes one or more spaces on one or more reels utilized by electronic gaming device 100 and/or electronic gaming system 200. Contagious wild module 412 may determine payouts related to game results when there are one or more contagious wilds present. It should be noted that contagious wild module 412 and dormant wild module 414 may be combined into one module. Further, there may be one evaluation module where the determined payout does not depend on whether there any contagious wilds and/or dormant wilds.

In another example, processor 302 via contagious wild module 412 (and/or contagious wild evaluation module 418) may determine that a contagious wild has interacted with: a first dormant wild to generate a first payout (e.g., 100 credits); a second dormant wild to generate a second payout (e.g., 1,000 credits); a wild to generate a third payout (e.g., 150 credits); one or more other contagious wild(s) to generate a fourth payout (e.g., 10,000 credits); two or more dormant wilds interrelated (e.g., next to each other, connected to each other, within a specific area; within a specific area to each other, etc.) to each other; two or more wilds interrelated (e.g., next to each other, connected to each other, within a specific area; within a specific area to each other, etc.) to each other; and/or any other interaction with any other symbol.

Dormant wild module 414 may store various dormant wild structures related to game results. For example, dormant wild structures may include one-to-five dormant wild(s) in a row; one-to-five dormant wild(s) in a column; one dormant wild in a second row, one dormant wild in a fourth row, and one dormant wild in a five row; one dormant wild in a first column, one dormant wild in a third column, one dormant wild in a fourth column, and one dormant wild in a fifth column; or any combination that utilizes one or more spaces on one or more reels utilized by electronic gaming device 100 and/or electronic gaming system 200. Dormant wild module 414 may determine payouts related to game results when there are one or more dormant wilds present. It should be noted that contagious wild module 412 and dormant wild module 414 may be combined into one module. Further, there may be one evaluation module where the determined payout does not depend on whether there were any contagious and/or dormant wilds.

In another example, processor 302 via dormant wild module 414 (and/or dormant wild evaluation module 420) may determine that a dormant wild has interacted with: a first contagious wild to generate a first payout (e.g., 100 credits); a second contagious wild to generate a second payout (e.g., 1,000 credits); a wild to generate a third payout (e.g., 150 credits); one or more other dormant wild(s) to generate a fourth payout (e.g., 10,000 credits); two or more contagious wilds interrelated (e.g., next to each other, connected to each other, within a specific area; within a specific area to each other, etc.) to each other; two or more wilds interrelated (e.g., next to each other, connected to each other, within a specific area; within a specific area to each other, etc.) to each other; and/or any other interaction with any other symbol.

Wild module 416 may determine payouts related to game results when there are one or more wild symbols utilized in the game results. For example, processor 302 via wild module 416 may determine that a wild has interacted with: a first dormant wild to generate a first payout (e.g., 100 credits); a second dormant wild to generate a second payout (e.g., 1,000 credits); a first contagious wild to generate a third payout (e.g., 150 credits); one or more other wilds to generate a fourth payout (e.g., 10,000 credits); two or more dormant wilds interrelated (e.g., next to each other, connected to each other, within a specific area; within a specific area to each other, etc.) to each other; two or more contagious wilds interrelated (e.g., next to each other, connected to each other, within a specific area; within a specific area to each other, etc.) to each other; and/or any other interaction with any other symbol. Wild module 416 may determine payouts related to game results when there are one or more wilds present (e.g., non-contagious and non-dormant wild). It should be noted wild module 416, dormant module 414, contagious wild module 412, or any combination thereof may be combined into one or more modules. Further, there may be one evaluation module where the determined payout does not depend on whether there were any wilds.

Contagious wild evaluation module 418 may determine payouts related to game results when there are contagious wilds utilized in the game results. For example, processor 302 via contagious wild evaluation module 418 may determine that a contagious wild has interacted with: a first dormant wild to generate a first payout (e.g., 25 credits); a second dormant wild to generate a second payout (e.g., 155 credits); a wild to generate a third payout (e.g., 350 credits); one or more other contagious wild(s) to generate a fourth payout (e.g., 1,000 credits); two or more dormant wilds interrelated (e.g., next to each other, connected to each other, within a specific area; within a specific area to each other, etc.) to each other; two or more wilds interrelated (e.g., next to each other, connected to each other, within a specific area; within a specific area to each other, etc.) to each other; and/or any other interaction with any other symbol. Contagious wild evaluation module 418 may determine how the contagious wilds affect the payout structure. It may also determine the effects of the contagious wilds on the surrounding symbols, including dormant wilds and blocking symbols (e.g., how many degrees of separation the contagious wild is able to affect, modifying dormant wilds into wilds, modifying dormant contagious wilds to contagious wilds, etc.). In addition, any other symbol (e.g., blocker symbols) may affect the characteristic of contagious wilds, wilds, dormant wilds, dormant contagious wilds, etc. For example, blockers may convert a contagious wild into a wild. Further, blockers may modify a dormant contagious wild to a blank symbol. Blockers may modify a dormant wild into a blank. It should be noted that contagious wild evaluation module 418, wild module 416, dormant module 414, contagious wild module 412, or any combination thereof may be combined into one or more modules. Further, there may be one evaluation module where the determined payout does not depend on whether there were any wilds.

For example, if a contagious wild is not adjacent to the dormant wild (e.g., separated by a row or column) then the contagious wild may still be able to activate the dormant wild. In another example, if a contagious wild has a blocking symbol between the contagious wild and a dormant wild, the contagious wild may be blocked from activating the dormant wild.

Dormant wild evaluation module 420 may determine payouts related to game results when there are dormant wild utilized in the game results. For example, processor 302 via dormant wild evaluation module 420 may determine that a dormant wild has interacted with: a first contagious wild to generate a first payout (e.g., 100 credits); a second contagious wild to generate a second payout (e.g., 1,000 credits); a wild to generate a third payout (e.g., 150 credits); one or more other dormant wild(s) to generate a fourth payout (e.g., 10,000 credits); two or more contagious wilds interrelated (e.g., next to each other, connected to each other, within a specific area; within a specific area to each other, etc.) to each other; two or more wilds interrelated (e.g., next to each other, connected to each other, within a specific area; within a specific area to each other, etc.) to each other; and/or any other interaction with any other symbol. Dormant wild evaluation module 420 may determine how the dormant wilds affect the payout structure. It may also determine the affects of the dormant wilds on the surrounding symbols, including other dormant wilds and blocking symbols (e.g., how many degrees of separation the wild is able to affect, modifying dormant wilds into wilds, modifying dormant contagious wilds to contagious wilds, etc.). In addition, any other symbol (e.g., blocker symbols) may affect the characteristic of contagious wilds, wilds, dormant wilds, dormant contagious wilds, etc. For example, blockers may convert a contagious wild into a wild. Further, blockers may modify a dormant contagious wild to a blank symbol. Blockers may modify a dormant wild into a blank. It may also determine the affects of other symbols on the dormant wild, including other dormant wilds, contagious wilds, and blocking symbols. It should be noted dormant wild evaluation module 420, contagious wild evaluation module 418, wild module 416, dormant module 414, contagious wild module 412, or any combination thereof may be combined into one or more modules. Further, there may be one evaluation module where the determined payout does not depend on whether there were any wilds.

A payout module may include various payouts, which may include explosive scatter payouts, non-scatter payouts, dormant scatter payouts, wild payouts, bonus payouts, and/or any other type of payout.

For example, if a dormant wild is not adjacent to the contagious wild (e.g., separated by a row or column) the contagious wild may still activate the dormant wild. Contagious wild may affect symbols that are any number (e.g., 1 to N) of spaces/areas away contagious wild. Further, dormant contagious wilds, dormant wilds, wilds, and/or blockers may affect symbols that are any number (e.g., 1 to N) of spaces/areas away from dormant contagious wilds, dormant wilds, wilds, and/or blockers.

In another example, if a dormant wild has a blocking symbol between dormant wild and a contagious wild, the contagious wild may be blocked from activating the dormant wild.

Evaluation module 422 may determine payouts related to game results when there are no contagious wilds, dormant wilds, wilds, and/or blockers.

FIG. 5(*a*) shows an illustration of screen image 500 of paylines and reels of electronic gaming device 100 with wilds, according to one embodiment. Screen image 500 may include a blank symbol 502, a dormant wild 504, a contagious wild 506, and a first contagious wild area 508. Screen image 500 may include a predetermined number of columns (e.g., a first column ("COL. V"), a second column ("COL. W"), a third column ("COL. X"), a fourth column ("COL. Y"), and a fifth column ("COL. Z") and a predetermined number of rows (e.g., a first row ("ROW A"), a second row ("ROW B"), a third row ("ROW C"), a fourth row ("ROW D"), and a fifth row ("ROW E"). Screen image 500 may include any number of rows and any number of columns. For example, screen image 500 may have five rows and ten columns; screen image 500 may have eight rows and thirteen columns, or any other combinations of rows and columns. A wagering event may be initiated by the player through input device 316.

In a game, positioning of the symbols on the reels may be displayed to show the outcome of a wagering event (e.g., a win or a loss for the player) on screen image 500. For example, it may be that if all columns in the first row (ROW A), (e.g., first column (COL. V), second column (COL. W), third column (COL. X), fourth column (COL. Y), and fifth column (COL. Z) have the same symbol (e.g., cherries, bars, pictures of the player as captured by camera 312, etc.), then a winning event has occurred. A winning combination (e.g., the lining up of the images) may happen in numerous ways. For example, if all symbol 502, which are touching by a shared side (e.g., first row (ROW A)/first column (COL. V), and first row (ROW A)/second column (COL. W) or by a corner (e.g., first row (ROW A)/first column (COL. V), and second row (ROW B)/second column (COL. W) have the same symbol 502, this may represent that a winning event has occurred. In another example, if all symbol, which are touching by a shared side (e.g., first row (ROW A)/first column (COL. V), and first row (ROW A)/second column (COL. W) or by a corner (e.g., first row (ROW A)/first column (COL. V), and second row (ROW B)/second column (COL. W) have the same symbol or an activated wild, this may represent that a winning event has occurred.

Screen image 500 may include dormant wild 504. Dormant wild 504 may be activated by contagious wild 506 depending on the interaction of dormant wild 504 with contagious wild 506. Dormant wild 504 may not be activated by contagious wild 506 based on a lack of interaction between dormant wild 504 with contagious wild 506. Dormant wild 504 may be activated by other dormant wilds (e.g., contagious dormant wilds). For example, if a contagious dormant wild is activated, the contagious dormant wild may be modified into a contagious wild. Dormant wild 504 may not be activated by other dormant wilds (e.g., non-contagious dormant wilds/dormant wilds). For example, if dormant wild 504 is located at a distance that is outside of contagious wild 506 activation reach, dormant wild 504 may not be activated. In another example, if dormant wild 504 is surrounded by all dormant wild 504 symbols (i.e., every space around the dormant wild 504 is a dormant wild 504), then dormant wild 504 may be activated.

Screen image 500 may include contagious wild 506. Contagious wild 506 may activate and/or modify other wilds and/or other symbols. Contagious wild 506 may not activate other wilds based on an interaction relationship (e.g., the position of contagious wild 506 relative to other symbols (e.g., blockers, blank symbols, dormant wilds, dormant contagious wilds, etc.). Contagious wild 506 may activate dormant wild 504. Contagious wild 506 may not activate dormant wild 504 based on an interaction relationship (e.g., the position of contagious wild 506 relative to other symbols (e.g., blockers, blank symbols, dormant wilds, dormant contagious wilds, etc.). Contagious wild 506 may change non-wilds into wilds and/or modify the characteristics of the non-wilds (e.g., change a blocker into a non-blocker). For example, if two contagious wilds are in a specific position (e.g., either side of blocker, to the left, to the right, above, below, etc.) relative to blocker, then the blocker may be converted into blank symbol 502, dormant wild 504, contagious wild 506, a wild, a dormant contagious wild, and/or any other symbol. Contagious wild 506 may be represented by any image and/or symbol, which may be predetermined to be contagious (e.g., zombies, fire, water, werewolves, cherries, picture taken by camera 312, etc.). For example, if contagious wild 506 is within an interactive position of a dormant wild, contagious wild 506 may activate dormant wild 504 to allow for a winning payline to be generated.

Contagious wild 506 may have different abilities to activate dormant wild 504, contagious dormant wilds, wilds, blockers, etc. Contagious wild 506 may be able to activate dormant wild 504 (or any other symbol), if contagious wild 506 is touching first contagious wild area 508. Contagious wild 506 may be able to activate dormant wild 504 (or any other symbol), if contagious wild 506 is within one space of touching first contagious wild area 508. Contagious wild 506 may be able to activate dormant wild 504 (or any other symbol), if contagious wild 506 is within any predetermined number of spaces of touching first contagious wild area 508. For example, different images may be assigned different levels of power (e.g., a zombie may be a 2 power level and a werewolf a 3 power level). The power may indicate how far away (i.e., the interactive positions) contagious wild 506 may be from dormant wild 504 (or any other symbol), and still activate dormant wild 504 (or any other symbol). Further, the power level (e.g., one space in any direction; two spaces in any direction; three spaces in any direction; one space to the left and two spaces to the right; two spaces down, four spaces up, and three spaces to the left; two spaces to the left, one space to the right, three spaces down, and five spaces up; and/or any combination of directional spaces. In another example, contagious wild 506 may have a power level that may activate a dormant wild 504, which is on the other side of screen image 500. For example, the power level may allow for a wraparound effect (e.g., second row (ROW B)/first column (COL. V) with second row (ROW B)/fifth column (COL. Z).

FIG. 5(*b*) shows an illustration of activated wilds (i.e., dormant wilds activated by contagious wilds) on a modified screen image 500, according to one embodiment. On modified screen image 500, a dormant wild may now be a first degree activated wild 510 within a second contagious wild area 512. First degree activated wild 510 was activated by contagious wild 506 with a power level of one (e.g. one directional space) because first degree activated wild 510 was in direct contact with first wild area 508, which was one directional space (e.g., one space to the right and one space down) away from contagious wild 506. For example, first degree activated wilds 510 may be located within second contagious wild area 512, so both may be activated by contagious wild 506. In another example, if one or more of dormant wilds 504 were contagious dormant wilds, then second contagious wild area 512 may have been expanded to include one or more other areas (e.g., Row B/Col. Y, Row B/Col.Z, Row D/Col. W, etc.).

On modified screen image 500, dormant wilds 504 located in fourth row (ROW D)/second column (COL. W) and second row (ROW B)/fourth column (COL. Y) may not be activated because the power rating of contagious wild 506 is not great enough (i.e., contagious wild 506 only has a power level of 1).

FIG. 5(*c*) shows an illustration of activated wilds (i.e., dormant wilds activated by contagious wilds) on modified screen image 500, according to one embodiment. On modified screen image 500, a dormant wild is now a second degree activated wild 514 within a third contagious wild area 516. Second degree activated wild 514 may be activated by contagious wild 506 with a power level of two (e.g., two directional space) because dormant wilds 504 were separated by two spaces from contagious wild 506. Second degree activated wild 514 was separated from contagious wild 506 by first degree activated wild 510 and was not in direct contact with first contagious wild area 508 and/or second contagious wild area 512, but was in direct contact with third degree activated wild area 516, which was two directional spaces (e.g., two spaces to the right and two spaces down) away from contagious wild 506. In another example, the two directional spaces may be one space to the right and then one space up, along with one space down and then one space to the left. Further, the directional spaces may be diagonal. For example, both first degree activated wild 510 and second degree activated wild 514 are located within third contagious wild area 516, so first degree activated wild 510 and/or second degree activated wild 514 may be activated by contagious wild 506. In another example, if one or more of dormant wilds 504 were contagious dormant wilds, then third contagious wild area 516 may have been expanded to include one or more other areas (e.g., Row D/Col. V, Row E/Col. V, Row B/Col. Z, etc.).

On modified screen image 500, dormant wilds 504 located in fourth row (ROW D)/first column (COL. V) and second row (ROW B)/fifth column (COL. Z) may not be activated due to the power rating of contagious wild 506 not being great enough (i.e., contagious wild 506 has only a power level of 2).

FIG. 5(*d*) shows an illustration of activated wilds (i.e., dormant wilds activated by contagious wilds) on modified screen image 500, according to one embodiment. On modified screen image 500, a dormant wild may now be a third degree activated wild 518 and a fourth degree activated wild 520 within a fourth contagious wild area 522. Third degree activated wild 518 may be activated by contagious wild 506 with a power level of three (e.g., three directional spaces), because dormant wilds 504 were separated by three directional spaces from contagious wild 506. Third degree activated wild 518 was separated from contagious wild 506 by first degree activated wild 510 and second degree activated wild 514 and was not in direct contact with first contagious wild area 508, second contagious wild area 512 and/or third contagious wild area 516 but was in direct contact with fourth degree activated wild area which was three directional spaces (e.g., three spaces to the right and two spaces down along with one space to the left) away from contagious wild 506.

Fourth degree activated wild 520 may be activated by contagious wild 506 with a power level of four (e.g., four directional spaces), because dormant wilds 504 were separated by four directional spaces from contagious wild 506. Fourth degree activated wild 520 was separated from contagious wild 506 by first degree activated wild 510, second degree activated wild 514, and/or third degree activated wild 518 and was not in direct contact with first contagious wild area 508, second contagious wild area 512, third contagious wild area 516, and/or fourth contagious wild area, but was in direct contact with fifth degree activated wild area 522, which was four directional spaces (e.g., two spaces down, one to the left, and then one more down) away from contagious wild 506. For example, first degree activated wild 510, second degree activated wild 514, third degree activated wild 518, and fourth degree activated wild 520 may all be located within fifth contagious wild area 522, which allows first degree activated wild 510, second degree activated wild 514, third degree activated wild 518, and/or fourth degree activated wild 520 to be activated by contagious wild 506.

FIG. 5(*e*) shows an illustration of activated wilds (i.e., dormant wilds activated by contagious wilds. In this example, the contagious wild is directional and in this example only converts the dormant wilds in a horizontal box 524 into wilds. Whereas, the dormant wilds in a vertical box 525 do not convert into wilds. In various examples, the contagious wild may be directional in any direction (e.g., up, down, left, right, up one space, up two spaces, up three spaces, etc., down one space, down two spaces, down three spaces, etc., left one space, left two spaces, left three spaces, etc., right one space, right two spaces, right three spaces, etc., up one space and to the left one space, up one space and to the left two spaces, up one space, to the right three spaces, down four spaces, and to the left five spaces, etc.).

Figure 6A:
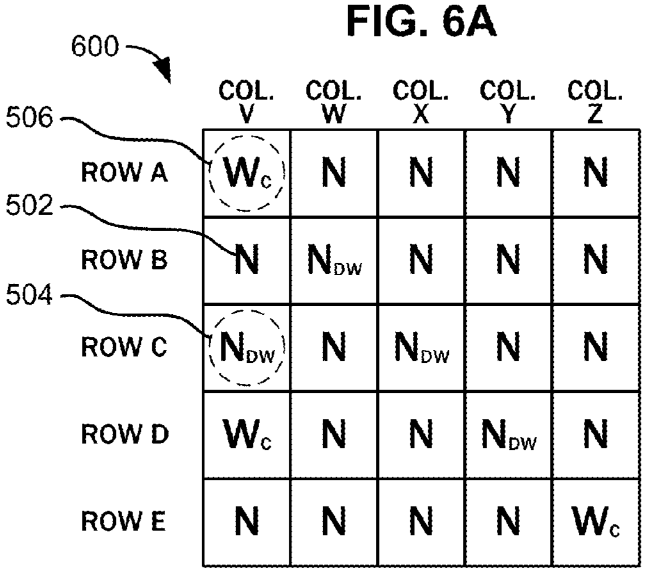
FIG. 6(*a*) is an illustration of paylines and reels of the electronic gaming device with contagious wilds and dormant wilds, according to one embodiment.
Figure 6B:
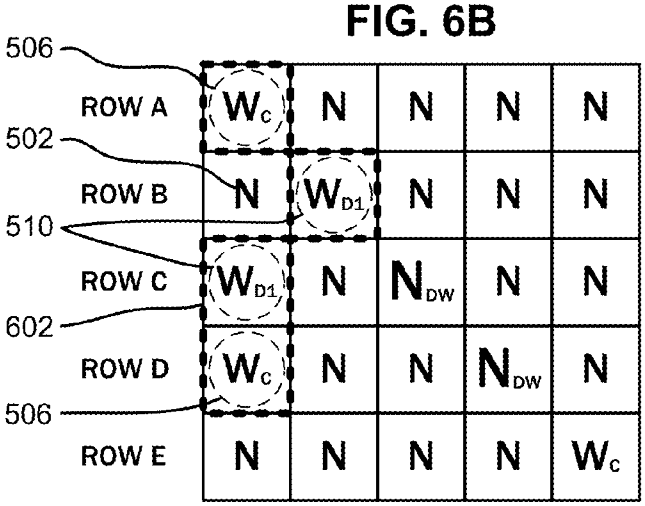
Figure 6C:
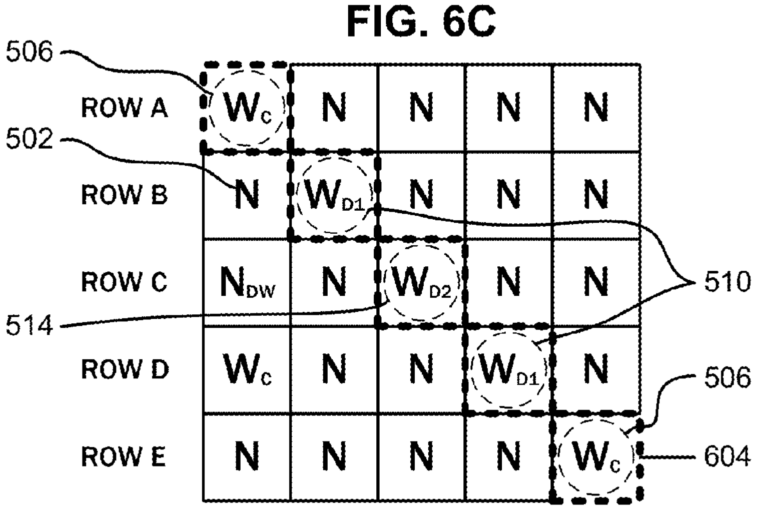

FIG. 6(*a*) shows an illustration of a screen image 600 of paylines and reels of electronic gaming device 100 with contagious wilds, according to one embodiment. Screen image 600 may include blank symbol 502, dormant wild 504, contagious wild 506, a wild symbol, a blocker symbol, and/or any other symbol.

Contagious wild 506 may have different abilities to activate dormant wild 504, contagious dormant wilds, wilds, blockers, and/or any other symbol. Contagious wild 506 may be able to activate dormant wild 504 (or any other symbol) that contagious wild 506 is touching. Contagious wild 506 may be able to activate dormant wild 504 (or any other symbol) that contagious wild 506 is within one space of touching. Contagious wild 506 may be able to activate dormant wild 504 (or any other symbol) that contagious wild 506 is within any predetermined number of spaces (e.g., 1 to N) of touching. For example, different images, symbols, and/or any other object may be assigned different levels of power (e.g., a zombie may have a power level of two and a werewolf may have a power level of three). The power level may indicate how far away contagious wild 506 can be from dormant wild 504 (or any other symbol) and still activate dormant wild 504

(or any other symbol). In another example, contagious wild 506 can have enough power where contagious wild 506 can activate a dormant wild 504, which would be sharing a side only if the screen were to be wrapped around (e.g., second row (ROW B)/first column (COL. V) with second row (ROW B)/fifth column (COL. Z).

FIG. 6(*b*) shows an illustration of activated wilds (i.e., dormant wilds activated by contagious wilds) on a modified screen image 600, according to one embodiment. On modified screen image 600, a dormant wild is modified to first degree activated wild 510 within a first wild area 602. Both first degree activated wilds 510 were activated by contagious wild 506 symbols with a power level of one that were in direct contact with dormant wilds 504. On modified screen image 600 contagious wild 506 in first row (ROW A)/first column (COL. V) is in direct contact at the corner with dormant wild 504 in second row (ROW B)/first column (COL. V) and contagious wild 506 in fourth row (ROW D)/first column (COL. V) is in direct contacted via a shared side with dormant wild 504 in third row (ROW C)/first column (COL. V).

On modified screen image 600, dormant wild 504 located in third row (ROW C)/third column (COL. X) may not be activated because contagious wild 506 only has a power level of one, which is not great enough to activate this specific dormant wild 504. On modified screen image 600, contagious wild 506 located in fifth row (ROW E)/fifth column (COL. Z) may be unable to activate dormant wild 504 in fourth row (ROW D)/fourth column (COL. Y) because contagious wild and dormant wild may be incompatible.

FIG. 6(*c*) shows an illustration of activated wilds (i.e., dormant wilds activated by contagious wilds) on modified screen image 600, according to one embodiment. On modified screen image 600, a dormant wild may be modified into second degree activated wild 514 in a second wild area 604. Second degree activated wild 514 may be activated by contagious wild 506 because contagious wild 506 has a power level of two, which may be created by the presence of two contagious wild 506 within second wild area 604. Second degree activated wild 514 may be separated by first degree activated wild 510 and not in direct contact with either of contagious wilds 506.

In another example, if the dormant wild (or any other symbol) is not susceptible to the contagious wild (i.e., immune to it) and/or cannot be modified by the contagious wild, the contagious wild (or any other symbol) may be unable to activate the dormant wild. On modified screen image 600, dormant wild located in third row (ROW C)/first column (COL. V) may not be activated because it may not be a compatible contagious wild (i.e., immune from the contagious wild).

Figure 7A:
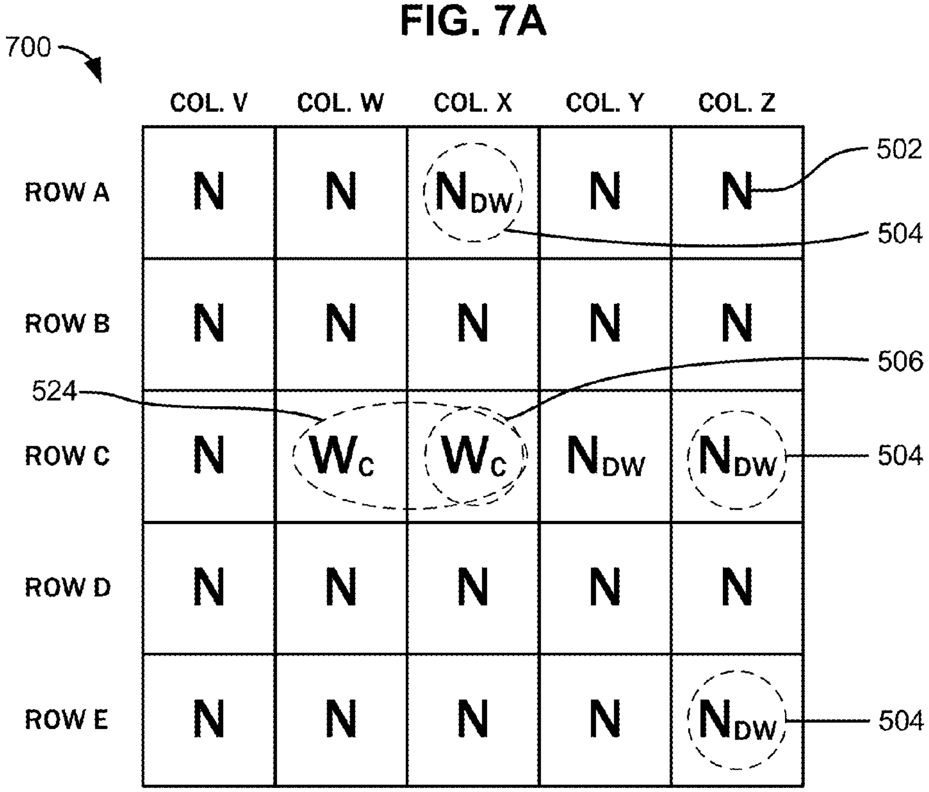
FIG. 7(*a*) is an illustration of paylines and reels of the electronic gaming device with contagious wilds and dormant wilds, according to one embodiment.
Figure 7B:
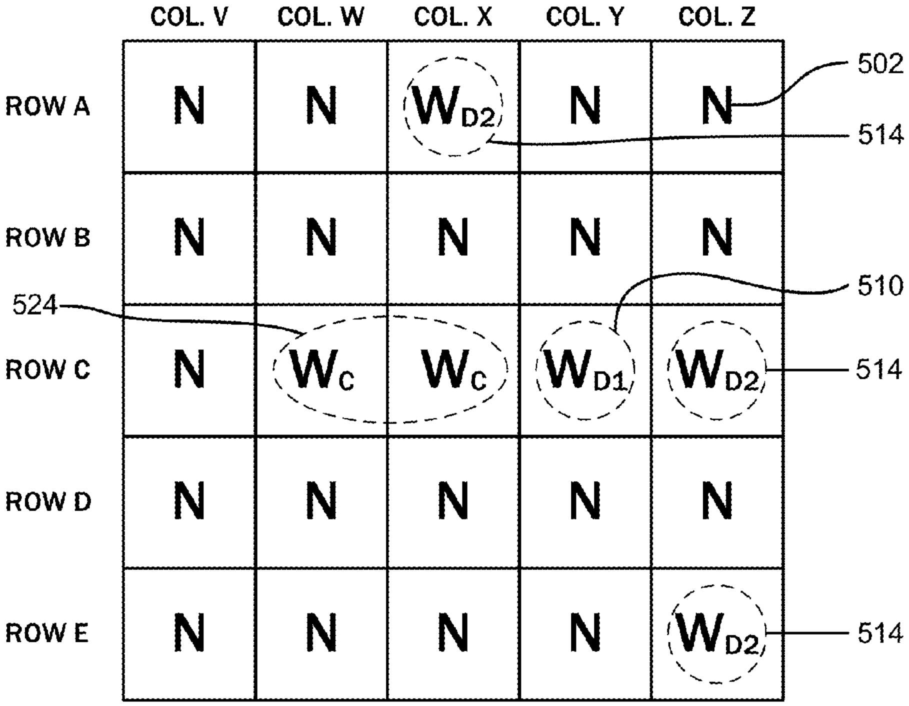

FIG. 7(*a*) shows an illustration of screen image 700 of paylines and reels of electronic gaming device 100 with various wilds, according to one embodiment. Screen image 700 may include blank symbol 502, dormant wild 504, contagious wild 506, and any other symbol.

Contagious wild 506 may have different abilities to activate dormant wild 504 (or any other symbol). Contagious wild 506 may increase (i.e., 1.1×, 1.25×, 1.5×, 2×, 3×, etc.) their power level when two or more contagious wilds 506 are located within an area (e.g., next to each other, within two spaces of each other, within three spaces of each other, etc.). In another example, contagious wild 506 may not increase their power level based on location data relating to another symbol (e.g., contagious wild 506, blocker, etc.). The presence of two contagious wild 506 next to each other (or any other locational parameter) may create a super contagious wild 524. Super contagious wild 524 may have added power to activate dormant wilds (or any other symbol) at an increased distance (e.g., power of two instead of power of one). For example, contagious wild 506 with a power level of one may be modified into super contagious wild 524 with a power level of four when located within one-dimensional spacing of another contagious wild 506. In another example, the presence of two contagious wild 506 next to each other may not create a super contagious wild 524.

FIG. 7(*b*) shows an illustration of activated wilds (i.e., dormant wilds activated by contagious wilds) on a modified screen image 700, according to one embodiment. On modified screen image 700, dormant wilds may be second degree activated wild 514 due to the presence of super contagious wild 524 with a power level of two. In this example, both first degree activated wild 510 and second degree active wild 514 were modified into wilds. In another example, first degree activated wild 510 and/or second degree activated wild 514 may be converted into contagious wilds that would modify any dormant wilds within a specific area (e.g., one space away, two spaces away, three spaces away, one space to the right and one space up, etc.).

Figure 8A:
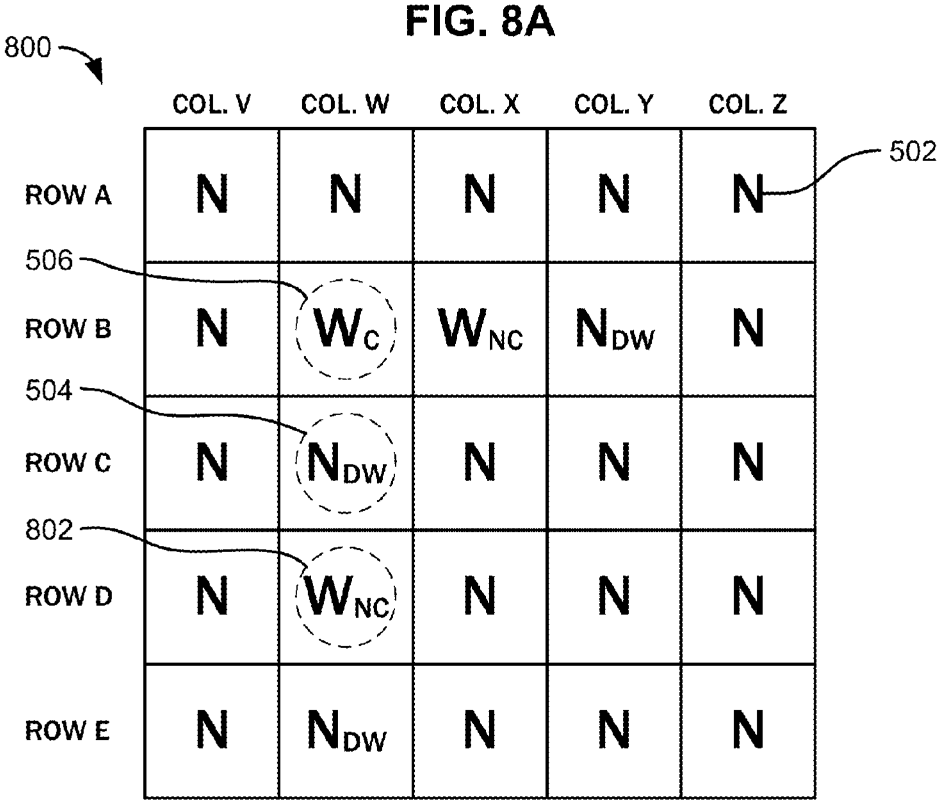
FIG. 8(*a*) is an illustration of paylines and reels of the electronic gaming device with contagious wilds, dormant wilds, and non-contagious wilds, according to one embodiment.
Figure 8B:
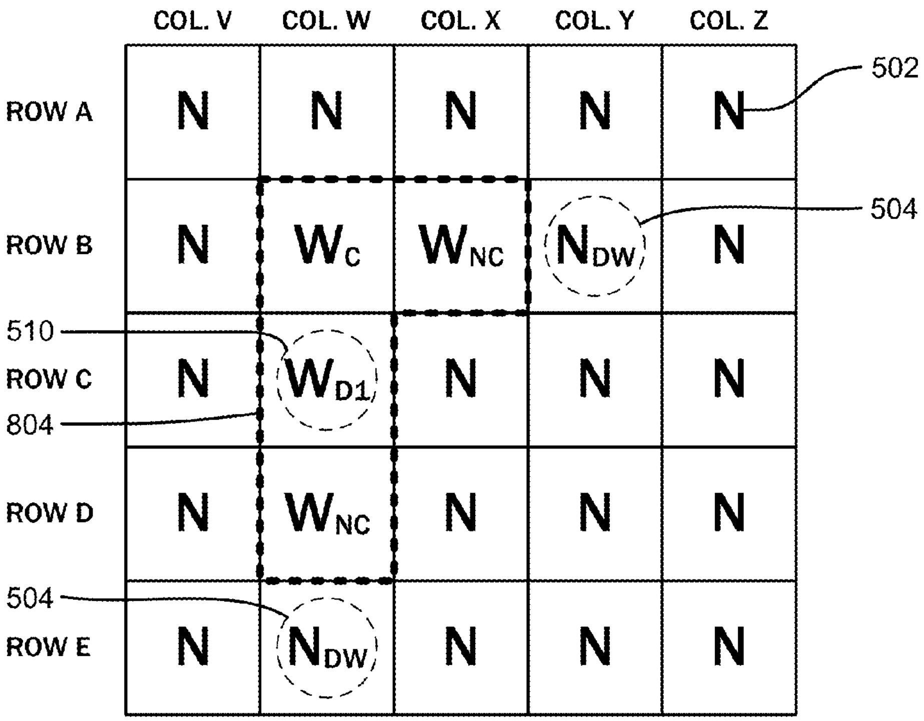

FIG. 8(*a*) shows an illustration of screen image 800 of paylines and reels of electronic gaming device 100 with contagious wilds, non-contagious wilds, and dormant wilds, according to one embodiment.

Screen image 800 may include a non-contagious wild 802. Non-contagious wild 802 may be a wild symbol, which does not modify any other symbol (e.g., convert a dormant wild into a wild). Non-contagious wild 802 may act as a dormant wild that may be activated by contagious wild 506. Noncontagious wild 802 may prevent contagious wild 506 from activating dormant wild 504. Non-contagious wild 802 may be converted into a contagious wild based on a location relative to another symbol. For example, if non-contagious wild 802 is located to the right of contagious wild 506, then non-contagious wild 802 may be converted into a contagious wild. In other example, non-contagious wild 802 may be located between two contagious wilds 506, which may modify non-contagious wild 802 into contagious wild.

In another example, dormant wild 504 may be converted into a contagious dormant wild based on an interaction position with any of the symbols. For example, dormant wild 504 being positioned next to non-contagious wild 802 may convert dormant wild 504 into a contagious dormant wild.

FIG. 8(*b*) shows an illustration of activated wild (i.e., dormant wilds activated by contagious wilds) on modified screen image 800, according to one embodiment. On modified screen image 800, noncontagious wild 802 located in second row (ROW B)/third column (COL. X) and noncontagious wild 802 located in fourth row (ROW D)/second column (COL. W) may prevent dormant wild 504 in second row (ROW B)/fourth column (COL. Y) and/or dormant wild 504 in fifth row (ROW E)/second column (COL. W) from being activated even when contagious wild 506 has a power level of two or greater. This restricts a fifth contagious wild area 804 from expanding beyond noncontagious wild 802. This restriction may be in one or more directions.

Figure 9A:
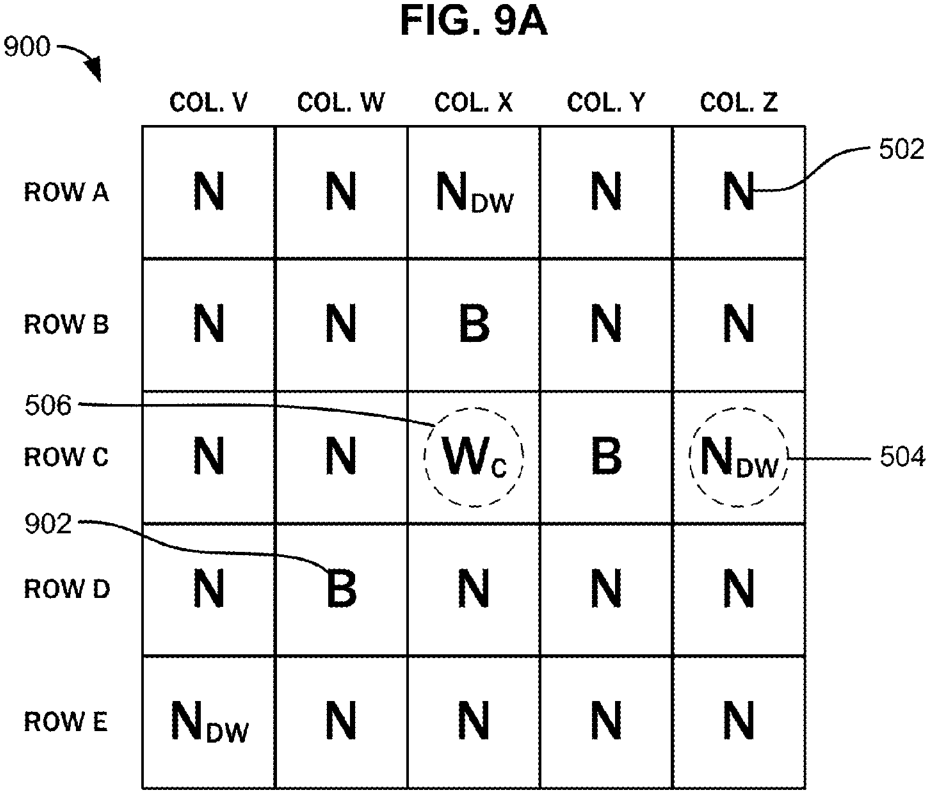
FIG. 9(*a*) is an illustration of paylines and reels of the electronic gaming device with contagious wilds, dormant wilds, and blockers, according to one embodiment.
Figure 9B:
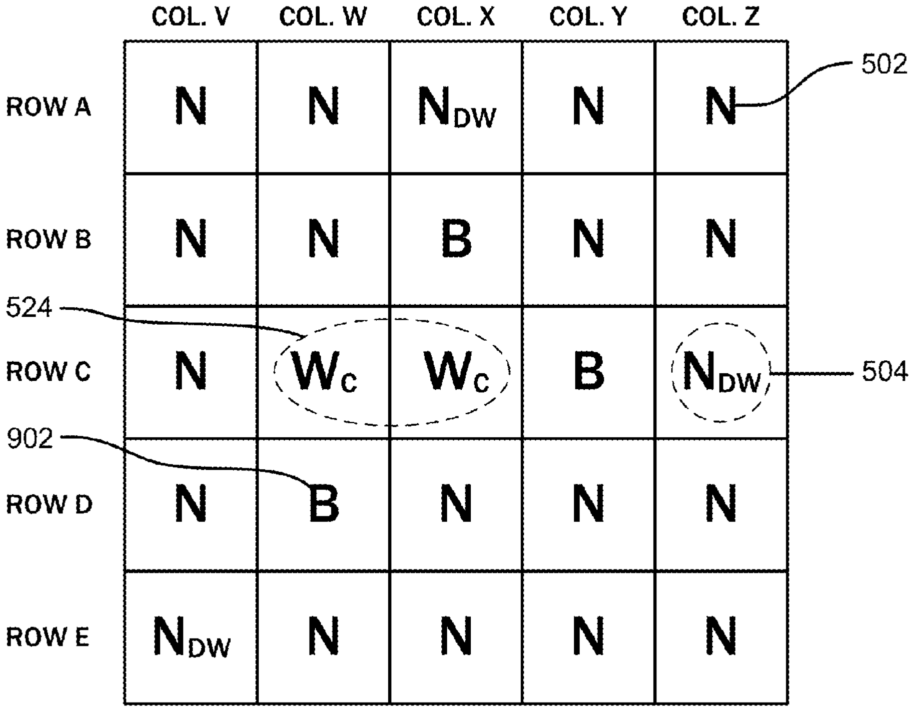

FIG. 9(*a*) shows an illustration of screen image 900 of paylines and reels of the electronic gaming device with wilds, according to one embodiment. Screen image 900 may include a blocking symbol 902. Blocking symbol 902 may prevent contagious wild 506 from activating dormant wild 504. For example, if blocking symbol 902 is located between contagious wild 506 and dormant wild 504, the activation may be blocked. Blocking symbol 902 may eliminate and/or limit any modification of any symbol by any other symbol.

FIG. 9(*b*) shows an illustration of activated wilds (i.e., dormant wilds activated by contagious wilds) on a modified screen image 900, according to one embodiment. On modified screen image 900, the presence of two contagious wild 506 next to each other may create super contagious wild 524. Super contagious wild 524 may have added power to activate dormant wilds at a further distance. Super contagious wild 524 may be neutralized by blocking symbol 902. For example, super contagious wild 524 may have a power level of two, but does not modify dormant wild located in Row A/Col. X because of the presents of blocker located in Row B/Col. X.

Super contagious wild 524 may activate a dormant wild even with the presence of blocking symbol 902 between them. For example, super contagious wild 524 may have a power level of three, which allows super contagious wild 524 to modify dormant wild located in Row A/Col. X. This may be because the blocker removes one level of power. Therefore, super contagious wild 524 would have a power level of two and be able to reach dormant wild located in Row A/Col. X. In another example, super contagious wild 524 with a power level of three may go around blocker symbol 902. In this example, the reach of super contagious wild 524 would go up two spaces on Col. W and then over one space on Row A to reach dormant wild located in Row A/Col. X.

Super contagious wild 524 may not activate a dormant wild with the presence of blocking symbol 902. For example, if super contagious wild 524 is comprised of two contagious wild 506 with a power level of two, then this may overcome blocking symbol 902. However, when the two contagious wilds 506 have a power level of one and a power level of two respectfully, this may not be enough power to overcome blocking symbol 902. The amount of power needed to overcome blocking symbol 902 may be game specific.

Figure 10:
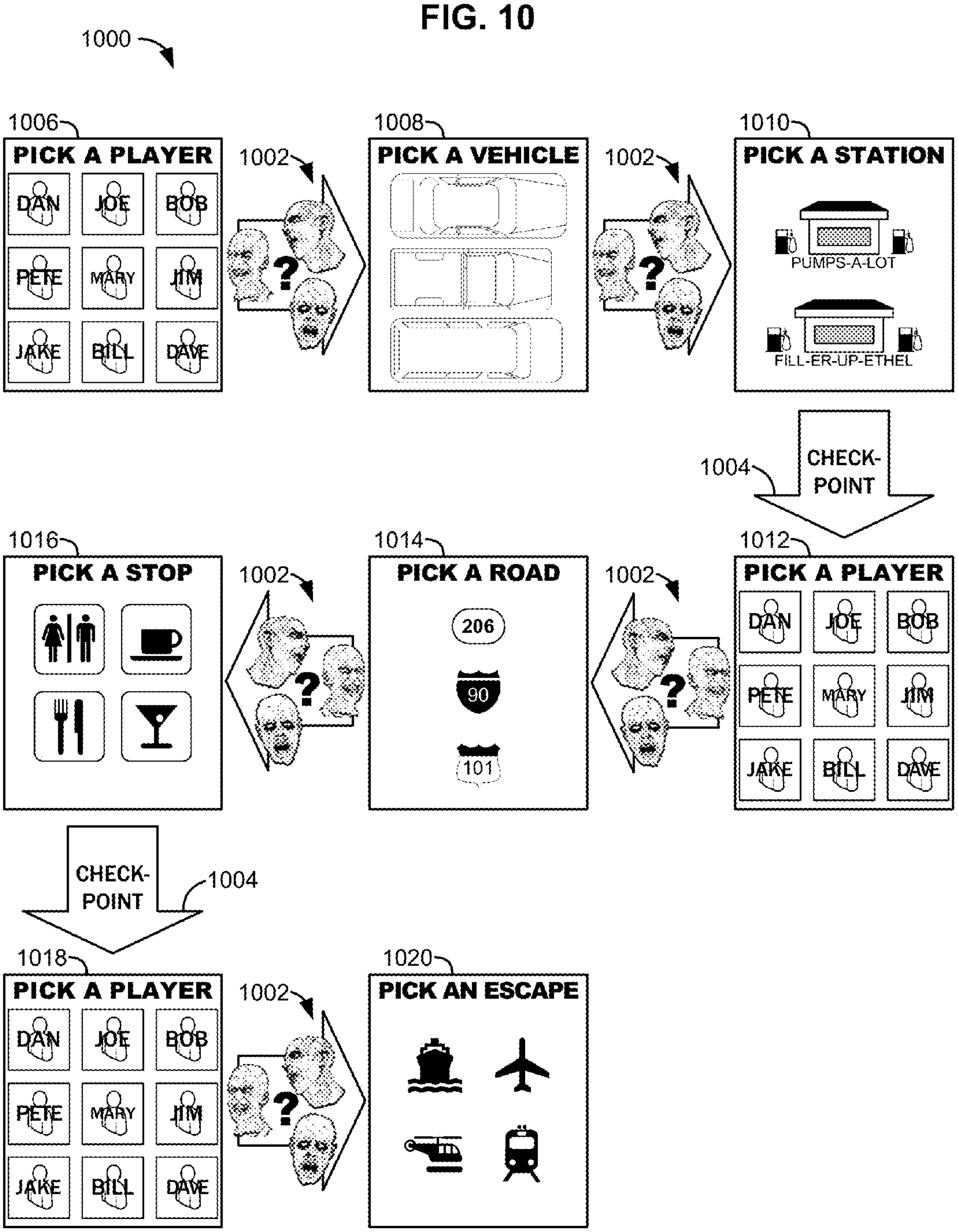
FIG. 10 is an illustration of a game play where an object (e.g., zombies) may attempt to stop another object (e.g., a survivor), according to one embodiment.

FIG. 10 shows an illustration of a game play 1000, where contagious wilds (e.g., zombies) may try to stop game progress, according to one embodiment. Game play 1000 may include an attack model 002, a checkpoint 1004, a first decision point 1006, a second decision point 1008, a third decision point 1010, a fourth decision point 1012, a fifth decision point 1014, a sixth decision point 1016, a seventh decision point 1018, and an end point 1020.

In attack mode 1002, zombies may be utilized to attempt to stop survivors from reaching one or more of the decision points. In attack mode 1002, the game may utilize werewolves, any creature, any image, and anything that could hinder a player's progress.

For example, the player may choose that they want to have bunny rabbits chasing the player's image and trying to stop their progress in the game. In another example, the player may choose to have police chasing the player's image and trying to stop their progress in the game. In another example, the player may choose to have vampires chasing the player's image and trying to stop their progress in the game.

Checkpoint 1004 may be a midpoint goal on the way to end point 1020. Checkpoint 1004 may be a place (e.g., city, state, restaurant, hotel, etc.). Checkpoint 1004 may be a position (e.g., half way up the mountain, spot on a board game, etc.). Checkpoint 1004 may be represented as a finish line (e.g., black and white checkered flag, etc.). Checkpoint 1004 may be a decision point for the player. For example, if the player selected that three characters would make it to checkpoint 1004, and seven characters make it to checkpoint 1004, the player may be able to revise their selection of how many characters will arrive at the next checkpoint 1004.

First decision point 1006 may be selecting a player/character to proceed in the game process. First decision point 1006 may be selecting how many characters make it to any one of the checkpoints 1004. First decision point 1006 may be selecting a door to enter. First decision point 1006 may be selecting a vehicle to drive, fly, or ride. First decision point 1006 may be any selection by the player of a mode of transportation. First decision point 1006 may be selecting a road to go down. First decision point 1006 may be picking a building to enter. First decision point 1006 may be selection of a city, state, or country to go to. First decision point 1006 may be any selection by the player of a place to go to. For example, the player may select between gas stations to fill up their car, boat, motorcycle, etc. For example, the player may select that they want to be a character that looks like a ninja. In another example, the player may select that they want to be a racecar. In another example, the player may select to be in the state of Georgia and trying to get to the end point of Florida.

Second decision point 1008 may be selecting a player/character to proceed in the game process. Second decision point 1008 may be selecting how many characters make it to the checkpoint 1004. Second decision point 1008 may be selecting a door to enter. Second decision point 1008 may be selecting a vehicle to drive, fly, or ride. Second decision point 1008 may be any selection by the player of a mode of transportation. Second decision point 1008 may be selecting a road to go down. Second decision point 1008 may be picking a building to enter. Second decision point 1008 may be selecting a city, state, or country to go to. Second decision point 1008 may be any selection by the player of a place to go to. For example, the player may select between gas stations to fill up their car, boat, motorcycle, etc. For example, the player may select that they want to be a character that looks like a field agent. In another example, the player may select that they want to be a tank. In another example, the player may select to be in the state of Maryland and trying to get to the end point of Florida.

Third decision point 1010 may be selecting a player/character to proceed in the game process. Third decision point 1010 may be selecting how many characters make it to the checkpoint 1004. Third decision point 1010 may be selecting a door to enter. Third decision point 1010 may be selecting a vehicle to drive, fly, or ride. Third decision point 1010 may be any selection by the player of a mode of transportation. Third decision point 1010 may be selecting a road to go down. Third decision point 1010 may be picking a building to enter. Third decision point 1010 may be selection of a city, state, or country to go to. Third decision point 1010 may be any selection by the player of a place to go to. For example, the player may select between gas stations to fill up their car, boat, motorcycle, etc. For example, the player may select that they want to be a character that looks like a ninja. In another example, the player may select that they want to be a racecar. In another example, the player may select to be in the state of Georgia and trying to get to the end point of Florida.

Fourth decision point 1012 may be selecting a player/character to proceed in the game process. Fourth decision point 1012 may be selecting how many characters make it to the checkpoint 1004. Fourth decision point 1012 may be selecting a door to enter. Fourth decision point 1012 may be selecting a vehicle to drive, fly, or ride. Fourth decision point 1012 may be selecting a road to go down. Fourth decision point 1012 may be picking a building to enter. Fourth decision point 1012 may be selection of a city, state, or country to go to. Fourth decision point 1012 may be any selection by the player of a mode of transportation. Fourth decision point 1012 may be any selection by the player of a place to go to. For example, the player may select between gas stations to fill up their car, boat, motorcycle, etc. For example, the player may select that they want to be a character that looks like a ninja. In another example, the player may select that they want to be a racecar. In another example, the player may select to be in the state of Georgia and trying to get to the end point of Florida.

Fifth decision point 1014 may be selecting a player/character to proceed in the game process. Fifth decision point 1014 may be selecting how many characters make it to the checkpoint 1004. Fifth decision point 1014 may be selecting a door to enter. Fifth decision point 1014 may be selecting a vehicle to drive, fly, or ride. Fifth decision point 1014 may be selecting a road to go down. Fifth decision point 1014 may be picking a building to enter. Fifth decision point 1014 may be selection of a city, state, or country to go to. Fifth decision point 1014 may be any selection by the player of a mode of transportation. Fifth decision point 1014 may be any selection by the player of a place to go to. For example, the player may select between gas stations to fill up their car, boat, motorcycle, etc. For example, the player may select that they want to be a character that looks like a ninja. In another example, the player may select that they want to be a racecar. In another example, the player may select to be in the state of Georgia and trying to get to the end point of Florida.

Sixth decision point 1016 may be selecting a player/character to proceed in the game process. Sixth decision point 1016 may be selecting how many characters make it to the checkpoint 1004. Sixth decision point 1016 may be selecting a door to enter. Sixth decision point 1016 may be selecting a vehicle to drive, fly, or ride. Sixth decision point 1016 may be selecting a road to go down. Sixth decision point 1016 may be picking a building to enter. Sixth decision point 1016 may be selection of a city, state, or country to go to. Sixth decision point 1016 may be any selection by the player of a mode of transportation. Sixth decision point 1016 may be any selection by the player of a place to go to. For example, the player may select between gas stations to fill up their car, boat, motorcycle, etc. For example, the player may select that they want to be a character that looks like a ninja. In another example, the player may select that they want to be a racecar. In another example, the player may select to be in the state of Georgia and trying to get to the end point of Florida.

Seventh decision point 1018 may be selecting a player/character to proceed in the game process. Seventh decision point 1018 may be selecting how many characters make it to the checkpoint 1004. Seventh decision point 1018 may be selecting a door to enter. Seventh decision point 1018 may be selecting a vehicle to drive, fly, or ride. Seventh decision point 1018 may be selecting a road to go down. Seventh decision point 1018 may be picking a building to enter. Seventh decision point 1018 may be selection of a city, state, or country to go to. Seventh decision point 1018 may be any selection by the player of a mode of transportation. Seventh decision point 1018 may be any selection by the player of a place to go to. For example, the player may select between gas stations to fill up their car, boat, motorcycle, etc. For example, the player may select that they want to be a character that looks like a ninja. In another example, the player may select that they want to be a racecar. In another example, the player may select to be in the state of Georgia and trying to get to the end point of Florida.

End point 1020 may be selecting a door to enter. End point 1020 may be selecting a vehicle to drive, fly, or ride. End point 1020 may be selecting a road to go down. End point 1020 may be picking a building to enter. End point 1020 may be arriving at the selected city, state, and/or country.

Game play 1000 may be an award for a winning event. Game play 1000 may be in the base game. Game play 1000 may be in the bonus game. Game play 1000 may be purchased through an additional wager (e.g., side bet). Game play 1000 may be based on any combination of the above.

Figure 11:
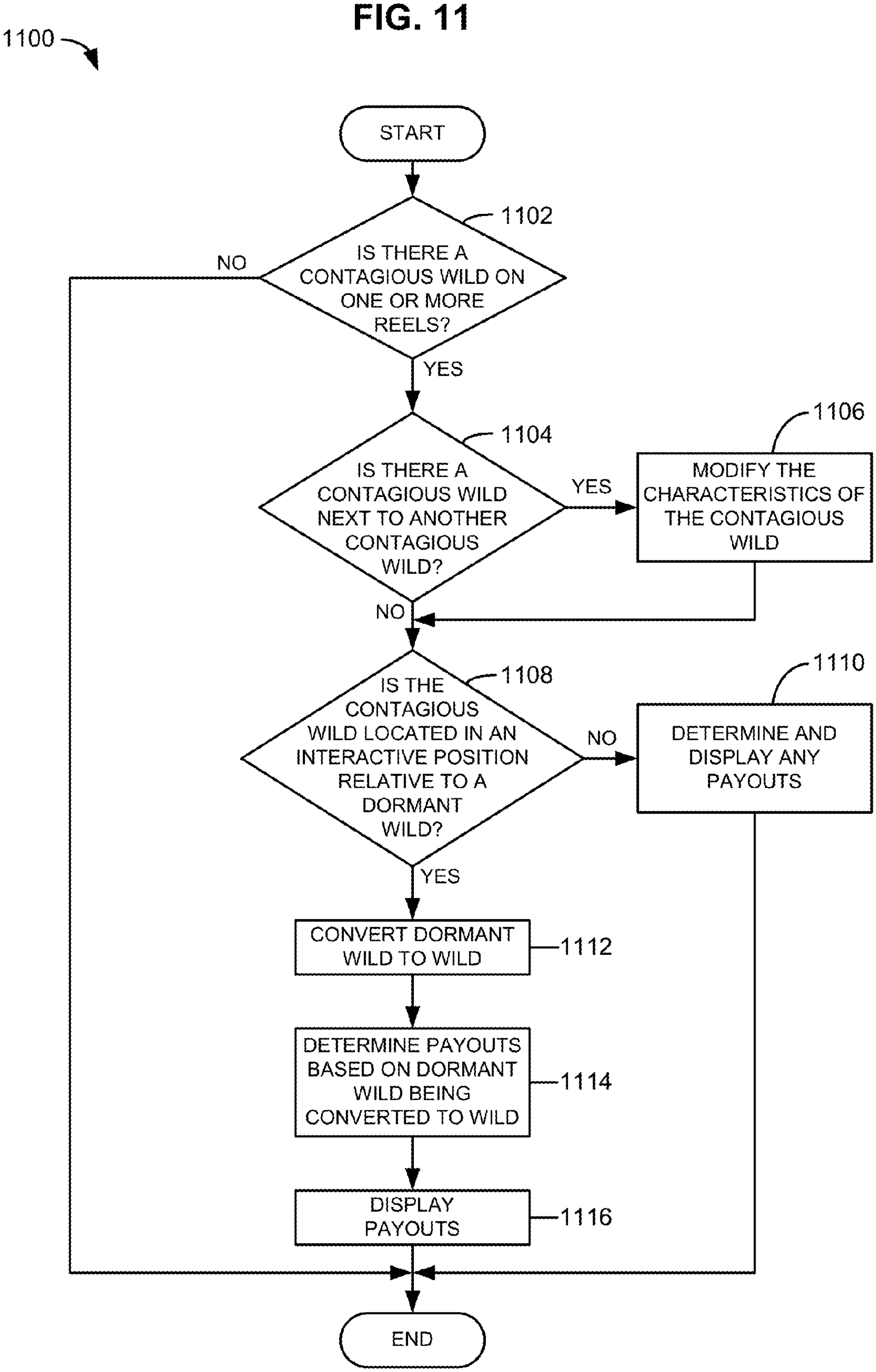
FIG. 11 is a flow diagram for allowing the activation of dormant wilds by contagious wilds and/or modifying a characteristic of a contagious wild, according to one embodiment.

FIG. 11 shows a process for activating dormant wilds by contagious wilds in a flow diagram 1100, according to an exemplary embodiment. The method may include the game starting. The method may include electronic gaming device 100 and/or electronic gaming system 200 determining whether there is a contagious wild on one or more reels (step 1102). If no contagious wilds are present, the game ends. If there are one or more contagious wilds, the method may include electronic gaming device 100 and/or electronic gaming system 200 determining whether there is a contagious wild next (or another predetermined location) to another contagious wild (step 1104). If there is a contagious wild next (or another predetermined location) to another contagious wild, the method may include modifying the contagious wild characteristics (step 1106). If no contagious wilds are next (or another predetermined location) to each other, or after the modification of contagious wild characteristics in step 1106, the method may include an evaluation of contagious wild location(s) in relation to that of a dormant wild location (step 1108). If no dormant wilds are present, or if they are outside of the interactive position, the method may include determining and displaying payouts (step 1110). If the dormant wilds are located in an interactive position related to the contagious wilds, then the method may include converting dormant wilds to active wilds (step 1112). The method may include determining the payout with the dormant wilds being converted to active wilds (step 1114). The method may include displaying payouts (step 1116) and ending. Any other symbols may be utilized (e.g., substituted) with this process and/or any other process in this disclosure.

Figure 12:
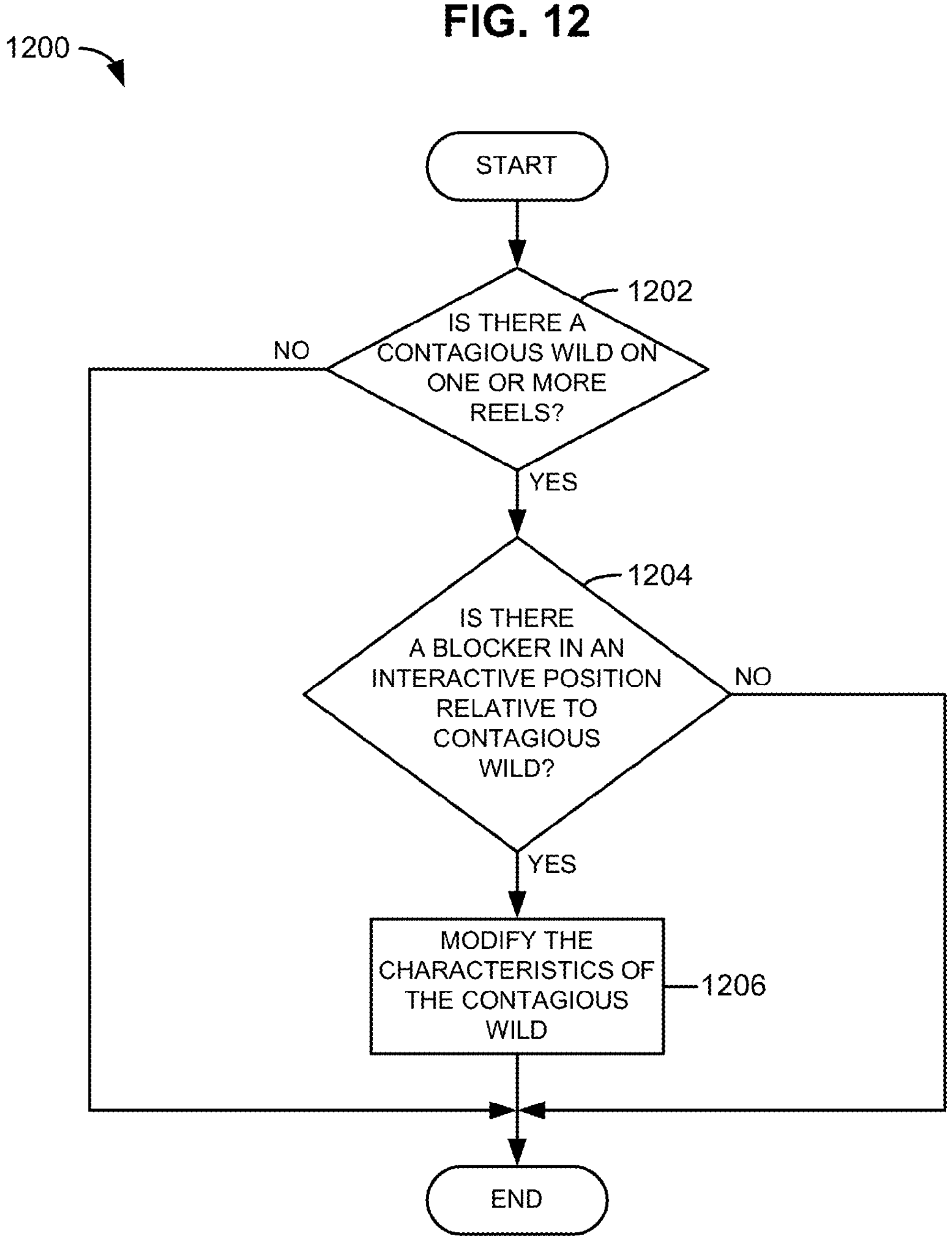
FIG. 12 is a flow diagram for blocking the activation of a dormant wild by a contagious wild and/or modifying a characteristic of a contagious wild, according to one embodiment.

FIG. 12 is a process demonstrating the blocking of the activation of dormant wilds by contagious wilds in a flow diagram 1200, according to an exemplary embodiment. The method may include the game starting. The method may include electronic gaming device 100 and/or electronic gaming system 200 determining whether there is a contagious wild on one or more reels (step 1202). If no contagious wilds are present, the game ends. If there were one or more contagious wilds, the method may include electronic gaming device 100 and/or electronic gaming system 200 determining whether there is a blocker present in an interactive position in relation to a contagious wild and/or a dormant wild (step 1204). If no blockers are present, or if they are outside of the interactive position, the method may end. If one or more blockers are located in an interactive position related to the contagious wilds and/or dormant wild, then the method may include modifying the characteristics of the contagious wild and/or dormant wild (step 1206) and the method may end. Any other symbol may be modified by the blocker. Any other symbol may modify any other symbol utilizing this process disclosed above.

Figure 13:
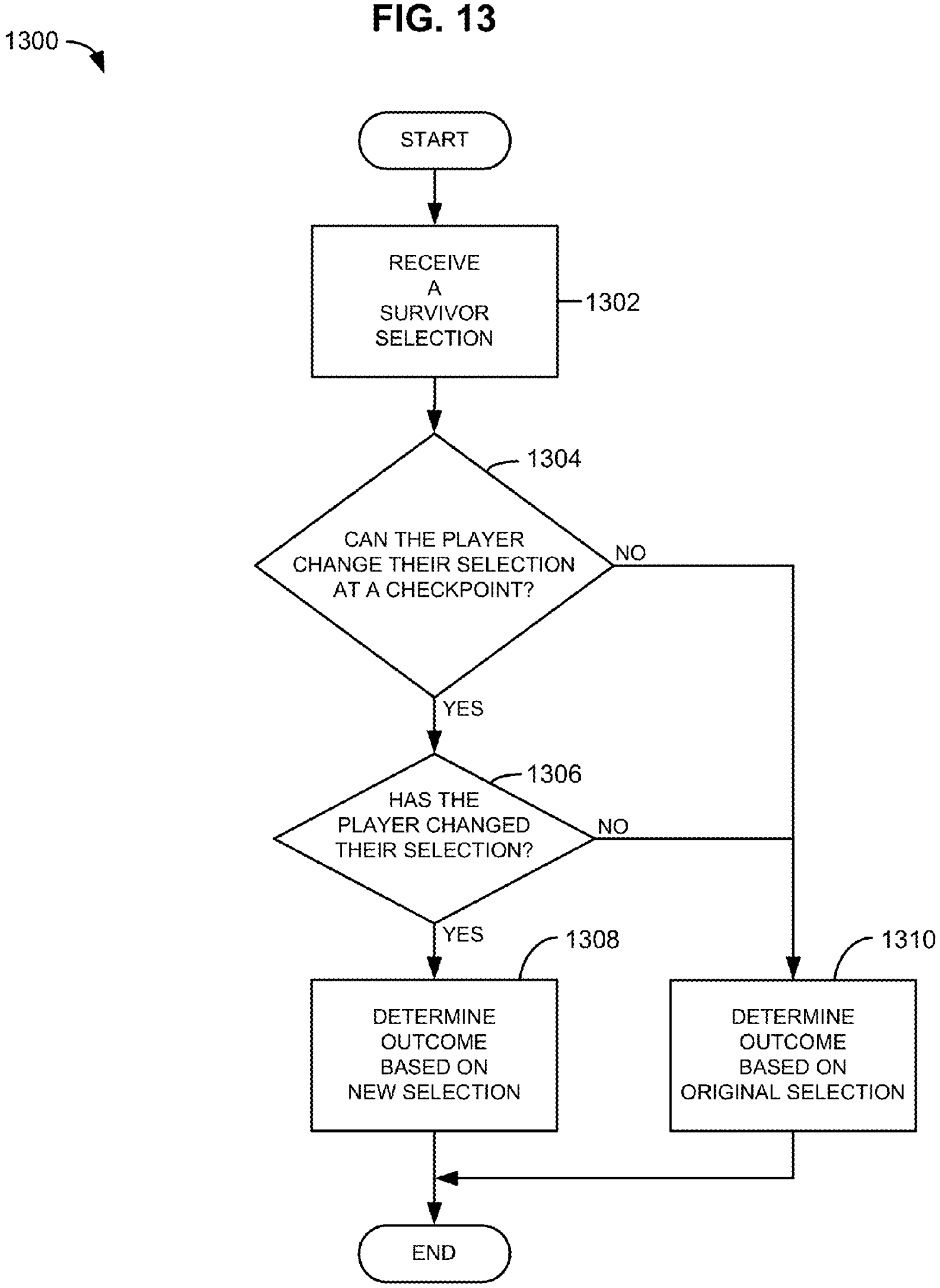
FIG. 13 is a flow diagram for a game play, according to one embodiment.

In FIG. 13, a process 1300 for selecting a potential winner is shown. The method starts the game. The method may include receiving a survivor selection (step 1302). The method may include electronic gaming device 100 and/or electronic gaming system 200 determining whether the player can change their selection at a checkpoint (step 1304). If the player cannot change their selection, then the method may determine an outcome based on an original selection (step 1310). If the player can change their selection, then electronic gaming device 100 and/or electronic gaming system 200 may determine whether the player has changed their selection (step 1306). If the player has not changed their selection, then the method may determine an outcome based on an original selection (step 1310). If the player has changed their selection, then the method determines an outcome based on the new selection (step 1308).

In one example, the electronic gaming device may include a plurality of reels, a memory, and a processor. The plurality of reels may include one or more areas. The processor may generate one or more symbols to be located in the one or more areas. The one or more symbols may include a first contagious wild symbol and a first dormant wild symbol. The processor may modify the first dormant wild symbol into one of a second contagious wild symbol and/or a wild symbol based on a first interaction determination. The processor may modify any symbol into any other symbol.

In another example, the first interaction determination may be based on a first contagious wild symbol location and a first dormant wild symbol location. Further, the first interaction determination may be that the first contagious wild symbol location is one area (or any number (e.g., 1 to N) away from the first dormant wild symbol location.

In another example, the processor may modify a first contagious wild symbol characteristic based on a second interaction determination. The second interaction determination may be based on a first contagious wild symbol location and a second contagious wild symbol location. The second interaction determination may be that the first contagious wild symbol location is one area (or any number (e.g., 1 to N) away from the second contagious wild symbol location.

In another example, the processor may modify one of a first contagious wild symbol characteristic, a first dormant wild symbol characteristic, and/or a second contagious wild symbol characteristic (or any symbol characteristic) based on a third interaction determination.

The third interaction determination may be based on a first contagious wild symbol location and a first dormant wild symbol location, a first contagious wild symbol location and a second contagious wild symbol location, and/or the first dormant wild symbol location and the second contagious wild symbol location. In addition, any relative location data (e.g., location of symbol X to symbol Y) may be utilized.

The third interaction determination may be one of that the first contagious wild symbol location is two areas away from the first dormant wild symbol location, the first contagious wild symbol location is two areas away from the second contagious wild symbol location, and the first dormant wild symbol location is two areas away from the second contagious wild symbol location. In addition, any relative location data (e.g., location of symbol X to symbol Y) may be utilized.

In another embodiment, the method may include displaying a first contagious wild symbol and displaying a first dormant wild symbol. The method may include determining a first interaction between the first contagious wild symbol and the first dormant wild symbol. The method may include modifying the first dormant wild symbol based on the first interaction.

In an example, the first interaction determination may be based on a first contagious wild symbol location and a first dormant wild symbol location.

The first interaction determination may be that the first contagious wild symbol location is one area away (or any number (e.g., 1 to N) from the first dormant wild symbol location.

The method may include modifying a first contagious wild symbol characteristic based on a second interaction determination. The second interaction determination may be based on a first contagious wild symbol location and a second contagious wild symbol location.

The second interaction determination may be that the first contagious wild symbol location is one area away (or any number (e.g., 1 to N) from the second contagious wild symbol location.

In another embodiment, the electronic gaming system may include a server including a server memory and a server processor. The server processor may display a plurality of reels which include one or more symbols. The one or more symbols may include a first contagious wild symbol and a first dormant wild symbol. The server processor may modify the first dormant wild symbol into a second contagious wild symbol and/or a wild symbol based on a first interaction determination. Electronic gaming system and electronic gaming device may utilize any feature described with the other device and/or system.

The plurality of reels may form a 5-by-5 matrix, a 3-by-5 matrix, a 4-by-5 matrix, a 4-by-3 matrix, a 5-by-3 matrix, or any number-by-any number matrix. In the figures various symbols were utilized. N may be any non-wild symbol. $N_{dw}$ may be any dormant wild symbol. $W_c$ may be a naturally occurring contagious wild symbol. $W_{d\#}$ may be a dormant wild that may turn wild where the # may indicate the order and/or the range. B is a symbol that may affect (minimize/downgrade/stop) other symbols (e.g., contagious wilds, dormant wilds, dormant contagious wilds, scatters, wilds, etc.).

In one embodiment, a contagious wild adjacent to a dormant wild may turn the dormant wild into a wild symbol (e.g., wild or contagious wild). In another embodiment, a dormant wild may turn wild if an adjacent dormant wild turns wild (e.g., wild or contagious wild). In another embodiment, a contagious wild on the same reel (e.g., column) as a dormant wild may turn the dormant wild into a wild symbol (e.g., wild or contagious wild). In another embodiment, a contagious wild on the same row as a dormant wild may turn the dormant wild into a wild symbol (e.g., wild or contagious wild). In another embodiment, a contagious wild on the same payline as a dormant wild may turn the dormant wild into a wild symbol (e.g., wild or contagious wild).

The free spin bonus round may have three different incarnations that may involve a special reward for a player if the player selects the right symbol at the start (or at a checkpoint) of the bonus round. At the start of the bonus round, the player may pick a dormant wild symbol (e.g., one of the survivor symbols in a zombie incarnation). The accumulating appearances over the course of the entire free spin bonus round of a dormant wild symbol compared to the appearance of the other dormant wild symbols may be utilized to determine if a special win has occurred. An on screen indicator during the free spins may show the accumulated totals for each dormant wild symbol. After each spin, these totals may be updated and may be reflected by an animation of the indicator.

In one embodiment, the appearances of the dormant symbols may be accumulated to determine a winning outcome. The dormant symbols may turn wild, may not turn wild, and/or a combination thereof. If the symbol the player picked at the beginning (or at a checkpoint) of the bonus round has the most appearances, the player may win a special reward.

In another embodiment, the appearances of the dormant symbols that do not turn wild may be accumulated to determine a win. If the symbol the player picked at the beginning (or at a checkpoint) of the bonus round has the most appearances without turning wild, the player may win a special award.

In another embodiment, the appearances of dormant symbols that do turn wild may be accumulated to determine a winning outcome. If the symbol the player picked at the beginning (or at a checkpoint) of the bonus round has the most appearances which turned wild, the player may win a special award.

In another embodiment, when free spins are completed, an evaluation of the accumulated symbol appearances may occur, and if the leading symbol is the symbol picked by the player at the start (or at a checkpoint) of the bonus round, the player may be given an additional reward. The additional reward may be a multiple of the bet, a flat amount, a reward associated with a progressive jackpot, a reward which varies based on the total number of appearances of the selected symbol, a pick bonus, a wheel bonus, free spins, and/or any combination thereof.

In one embodiment, a process may randomly generate various symbols on a matrix of symbols which produces an outcome (e.g., winning combination or losing combination). The outcome may be determined by the combination of symbols which are along predefined paylines. These symbols may be designated as a wild symbol which may be substituted for any other symbol to create a winning combination. In another embodiment, the process may convert non-wild symbols to wild symbols by designating one or more such symbols as dormant wilds that only become wild under specific conditions and interactions.

In various embodiments, these conversions may be based on adjacent logic, optional chain reaction logic, mandatory chain reaction logic, varying chain reaction logic, random logic, varying logic, directional logic, pathway logic, and/or any combination thereof. In another embodiment, a dormant wild may turn wild when the dormant wild lands adjacent to a naturally occurring wild (e.g., contagious wild) symbol. In another embodiment, a dormant wild may turn wild if an adjacent dormant wild symbol turns wild. In another embodiment, a dormant wild may turn wild if a naturally occurring wild (e.g., contagious wild) appears anywhere on the same vertical column. In another embodiment, a dormant wild may turn wild if a naturally occurring wild (e.g., contagious wild) appears anywhere on the same horizontal row. In another embodiment, a dormant wild may turn wild if a naturally occurring wild (e.g., contagious wild) appears anywhere on the same payline. In another embodiment, a dormant wild may turn wild spontaneously and apparently at random. In another embodiment, a dormant wild may turn wild whenever certain advertised conditions are met.

In one example, a free spin bonus win may be where a player is rewarded additional reel spins at no additional cost. The free spin may include a pick element whereby a player picks a dormant wild symbol from a variety of other dormant wild symbols at the onset of the bonus. The appearances of the dormant wild symbols may accumulate over the course of the free spin bonus round. An additional win may be determined if a player had picked the dormant symbol with the greatest accumulation.

In one example, a method of accumulating dormant wild symbols may be based on counting dormant wilds that do not become wild. In another example, the method may include counting only those dormant wilds that do become wild. In an example, the method may include counting any appearances of dormant symbols once the reels have stopped spinning. The method may include determining an outcome based on the accumulated number of appearances of the symbol. The method may include determining an outcome which is based on varying the reward based on which dormant wild symbol was chosen.

In one embodiment, the electronic gaming device may include a plurality of reels, a memory, and one or more processors. The plurality of reels may include one or more areas. The one or more processors may generate one or more symbols to be located in the one or more areas. The one or more symbols may include a first directional contagious wild symbol and a first dormant wild symbol. The one or more processors may modify the first dormant wild symbol into a contagious wild symbol, a wild symbol, and/or any other symbol based on a first interaction determination.

In another example, the first interaction determination may be based on a first directional contagious wild symbol location and a first dormant wild symbol location. In one example, the first interaction determination may be that the first directional contagious wild symbol location is one area away from the first dormant wild symbol location. In one example, the one or more processors may modify a first directional contagious wild symbol characteristic based on a second interaction determination. In an example, the second interaction determination may be based on a first directional contagious wild symbol location and a contagious wild symbol location. In another example, the second interaction determination may be that the first directional contagious wild symbol location is one area away from the contagious wild symbol location. In one example, the one or more processors may modify a first directional contagious wild symbol characteristic, a first dormant wild symbol characteristic, a contagious wild symbol characteristic and/or any other symbol characteristic based on a third interaction determination. In another example, the third interaction determination may be based on a first directional contagious wild symbol location and a first dormant wild symbol location, a first directional contagious wild symbol location and a contagious wild symbol location, and/or the first dormant wild symbol location and the contagious wild symbol location. In one example, the third interaction determination may be that the first directional contagious wild symbol location is two areas away from the first dormant wild symbol location, the first directional contagious wild symbol location is two areas away from the contagious wild symbol location, and/or the first dormant wild symbol location is two areas away from the contagious wild symbol location.

In another embodiment, the method of providing gaming options via an electronic gaming device may include displaying a first directional contagious wild symbol. The method may include displaying a first dormant wild symbol. The method may include determining a first interaction between the first directional contagious wild symbol and the first dormant wild symbol. The method may include modifying the first dormant wild symbol based on the first interaction.

In another example, the first interaction determination may be based on a first directional contagious wild symbol location and a first dormant wild symbol location. The first interaction determination may be that the first directional contagious wild symbol location is one area away from the first dormant wild symbol location. The method may include modifying a first directional contagious wild symbol characteristic based on a second interaction determination. The second interaction determination may be based on a first directional contagious wild symbol location and a contagious wild symbol location. The second interaction determination may be that the first directional contagious wild symbol location is one area away from the contagious wild symbol location.

In another embodiment, the electronic gaming system may include a server which includes a server memory and a server processor. The server processor may display a plurality of reels which include one or more symbols. The one or more symbols may include a first directional contagious wild symbol and a first dormant wild symbol. The server processor may modify the first dormant wild symbol into a contagious wild symbol, a wild symbol, and/or any other symbol based on a first interaction determination.

In one example, the first interaction determination may be based on a first directional contagious wild symbol location and a first dormant wild symbol location. In another example, the first interaction determination may be that the first directional contagious wild symbol location is one area away from the first dormant wild symbol location. In one example, the server processor may modify a first directional contagious wild symbol characteristic based on a second interaction determination. In another example, the second interaction determination may be based on a first directional contagious wild symbol location and a contagious wild symbol location.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," "another example," and/or any similar language should be considered to mean that the particular features, structures, or characteristics may be combined in one or more examples. While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:

a plurality of reels, the plurality of reels including one or more areas;

a memory;

a processor configured to generate one or more symbols to be located in the one or more areas, the one or more symbols include a first directional contagious wild symbol and a first dormant wild symbol, the processor configured to determine one of a plurality of different predetermined directional movement path patterns to expand the first directional contagious wild symbol, the processor configured to determine a first interaction determination that determines a selected predetermined directional movement path pattern from the plurality of predetermined directional movement path patterns, the processor configured to modify the first dormant wild symbol into at least one of a contagious wild symbol and a wild symbol based on the selected predetermined directional movement path pattern and the processor configured to expand the first directional contagious wild symbol based on the selected predetermined directional movement path pattern into the first dormant wild symbol.

2. The electronic gaming device of claim 1, wherein the first interaction determination is based on a first directional contagious wild symbol location and a first dormant wild symbol location.

3. The electronic gaming device of claim 2, wherein the first interaction determination is that the first directional contagious wild symbol location is one area away from the first dormant wild symbol location.

4. The electronic gaming device of claim 1, wherein the processor is further configured to modify a first directional contagious wild symbol characteristic based on a second interaction determination.

5. The electronic gaming device of claim 4, wherein the second interaction determination is based on a first directional contagious wild symbol location and a contagious wild symbol location.

6. The electronic gaming device of claim 5, wherein the second interaction determination is that the first directional contagious wild symbol location is one area away from the contagious wild symbol location.

7. The electronic gaming device of claim 1, wherein the processor is further configured to modify at least one of a first directional contagious wild symbol characteristic, a first dormant wild symbol characteristic, and a contagious wild symbol characteristic based on a third interaction determination.

8. The electronic gaming device of claim 7, wherein the third interaction determination is based on at least one of a first directional contagious wild symbol location and a first dormant wild symbol location, a first directional contagious wild symbol location and a contagious wild symbol location, and the first dormant wild symbol location and the contagious wild symbol location.

9. The electronic gaming device of claim 8, wherein the third interaction determination is at least one of that the first directional contagious wild symbol location is two areas away from the first dormant wild symbol location, the first directional contagious wild symbol location is two areas away from the contagious wild symbol location, and the first dormant wild symbol location is two areas away from the contagious wild symbol location.

10. A method of providing gaming options via an electronic gaming device comprising:

displaying a first directional contagious wild symbol;

displaying a first dormant wild symbol;

determining a predetermined directional movement path pattern from a plurality of different predetermined directional movement path patterns to expand the first directional contagious wild symbol;

determining via one or more processors a first interaction determination that determines a selected predetermined directional movement path pattern from the plurality of predetermined directional movement path patterns;

expanding the first directional contagious wild symbol based on the selected predetermined directional movement path pattern into the first dormant wild symbol; and modifying via the one or more processors the first dormant wild symbol into at least one of a contagious wild symbol and a wild symbol based on the selected predetermined directional movement path pattern.

11. The method of claim 10, wherein the first interaction determination is based on a first directional contagious wild symbol location and a first dormant wild symbol location.

12. The method of claim 11, wherein the first interaction determination is that the first directional contagious wild symbol location is one area away from the first dormant wild symbol location.

13. The method of claim 10, further comprising modifying a first directional contagious wild symbol characteristic based on a second interaction determination.

14. The method of claim 13, wherein the second interaction determination is based on a first directional contagious wild symbol location and a contagious wild symbol location.

15. The method of claim 14, wherein the second interaction determination is that the first directional contagious wild symbol location is one area away from the contagious wild symbol location.

16. An electronic gaming system comprising:

a server including a server memory and a server processor, the server processor configured to display a plurality of reels which include one or more symbols, the one or more symbols include a first directional contagious wild symbol and a first dormant wild symbol; and the server processor configured to determine one of a plurality of different predetermined directional movement path patterns to expand the first directional contagious wild symbol, the server processor configured to determine a first interaction determination that determines a selected predetermined directional movement path pattern from the plurality of predetermined directional movement path patterns, the server processor configured to modify the first dormant wild symbol into at least one of a contagious wild symbol and a wild symbol based on the selected predetermined directional movement path pattern and the server processor configured to expand the first directional contagious wild symbol based on the selected predetermined directional movement path pattern into the first dormant wild symbol.

17. The electronic gaming system of claim 16, wherein the first interaction determination is based on a first directional contagious wild symbol location and a first dormant wild symbol location.

18. The electronic gaming system of claim 17, wherein the first interaction determination is that the first directional contagious wild symbol location is one area away from the first dormant wild symbol location.

19. The electronic gaming system of claim 16, wherein the server processor is further configured to modify a first directional contagious wild symbol characteristic based on a second interaction determination.

20. The electronic gaming system of claim 19, wherein the second interaction determination is based on a first directional contagious wild symbol location and a contagious wild symbol location.

* * * * *